United States Patent [19]

Tiemann et al.

[11] Patent Number: 4,533,936

[45] Date of Patent: Aug. 6, 1985

[54] SYSTEM FOR ENCODING AND DECODING VIDEO SIGNALS

[75] Inventors: Jerome J. Tiemann, Schenectady; William E. Engeler, Scotia, both of N.Y.

[73] Assignee: General Electric Company, Schenectady, N.Y.

[21] Appl. No.: 479,584

[22] Filed: Mar. 28, 1983

[51] Int. Cl.³ ............................................. H04N 9/32
[52] U.S. Cl. ............................................. 358/12
[58] Field of Search ........................................ 358/12

[56] References Cited

U.S. PATENT DOCUMENTS 4,467,356  8/1984  McCoy ................................. 358/12
4,473,837  9/1984  Tiemann ............................... 358/12

Primary Examiner—Richard Murray
Attorney, Agent, or Firm—Julius J. Zaskalicky; James C. Davis, Jr.; Marvin Snyder

[57] ABSTRACT

A first video signal is provided comprising a plurality of lines of a luminance signal, a first color signal and a second color signal, each of the lines having a duration of a first predetermined time. Each of the nonoverlapping pairs of successive lines of the luminance signal are summed and differenced to provide a luminance sum signal and a luminance difference signal. Each of the nonoverlapping pairs of successive lines of the first color signal and also of the second color signal are summed to provide a first color sum signal and a second color sum signal. The luminance difference signal, the first color sum signal and the second color sum signal are bandwidth limited in relation to the luminance sum signal. Corresponding lines of these signals are time compressed to the same bandwidth and then time multiplexed to form a corresponding line of a first compound signal, each line of which has a duration of the aforementioned predetermined time, and alternate lines of which have zero amplitude. A second video signal is similarly processed to provide a second compound signal. The first and second compound signals are interleaved to form a third compound signal such that the time of the non-zero amplitude of the second compound signal occupies the time when the first compound signal has zero amplitude. A carrier is modulated in amplitude by the third compound signal for transmission to a receiving station. The bandwidth of the modulated carrier is comparable to the bandwidth of a carrier that is amplitude modulated by one of the video signals. The carrier is demodulated at the receiving station to recover the third compound signal. The first or second compound signal is recovered from the third compound signal. Inverse operations are utilized to recover the first or second video signals.

18 Claims, 35 Drawing Figures

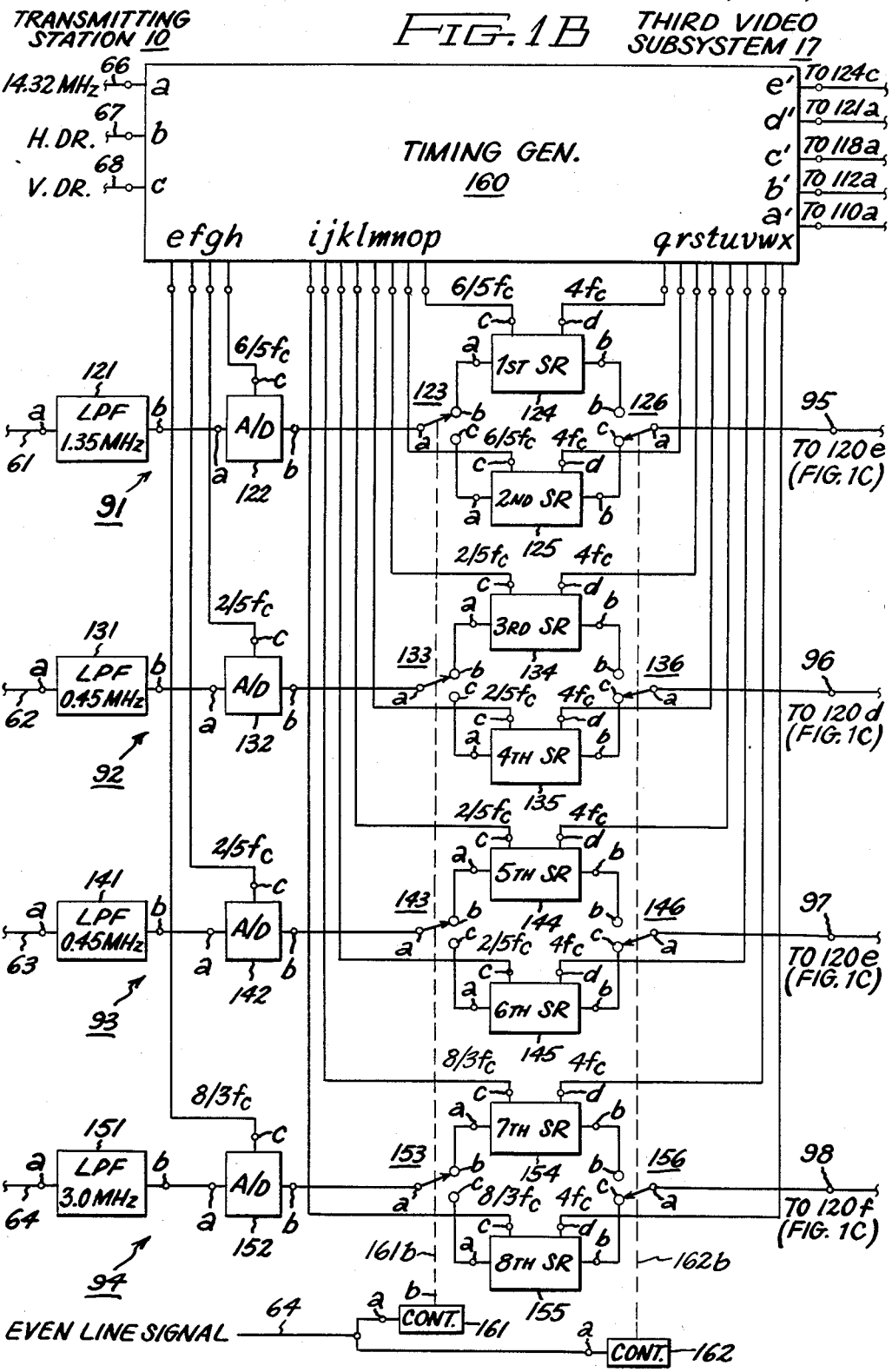

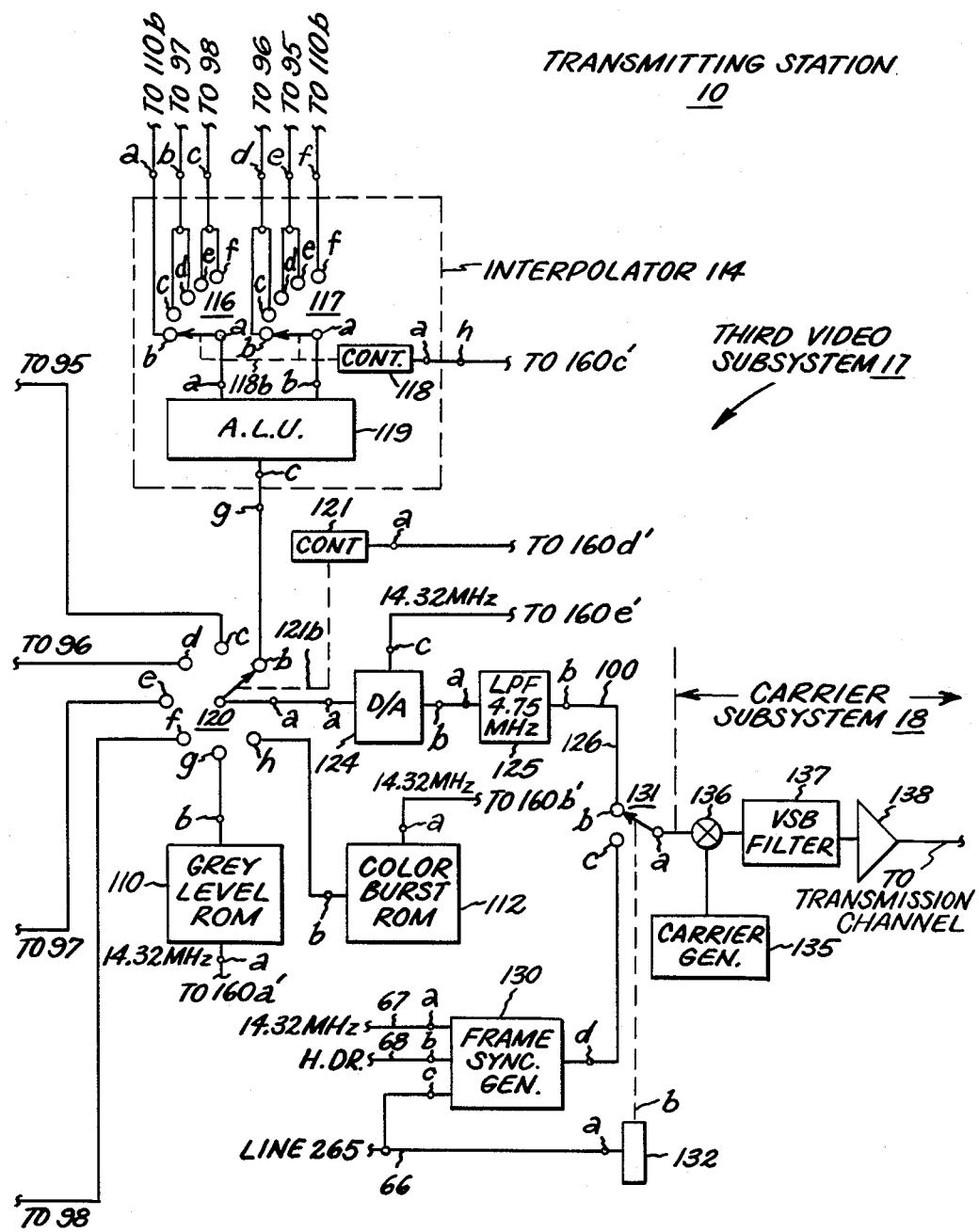

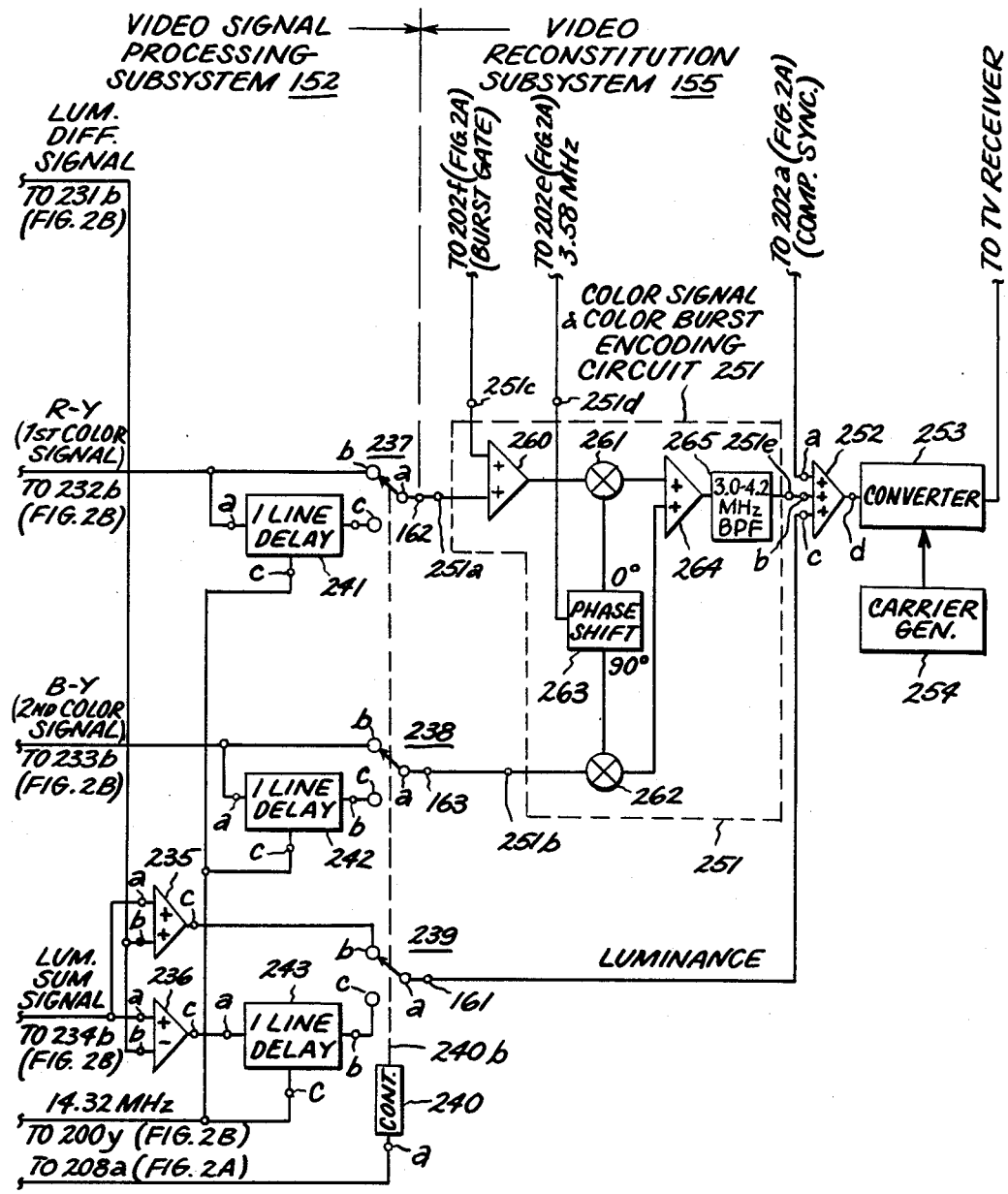

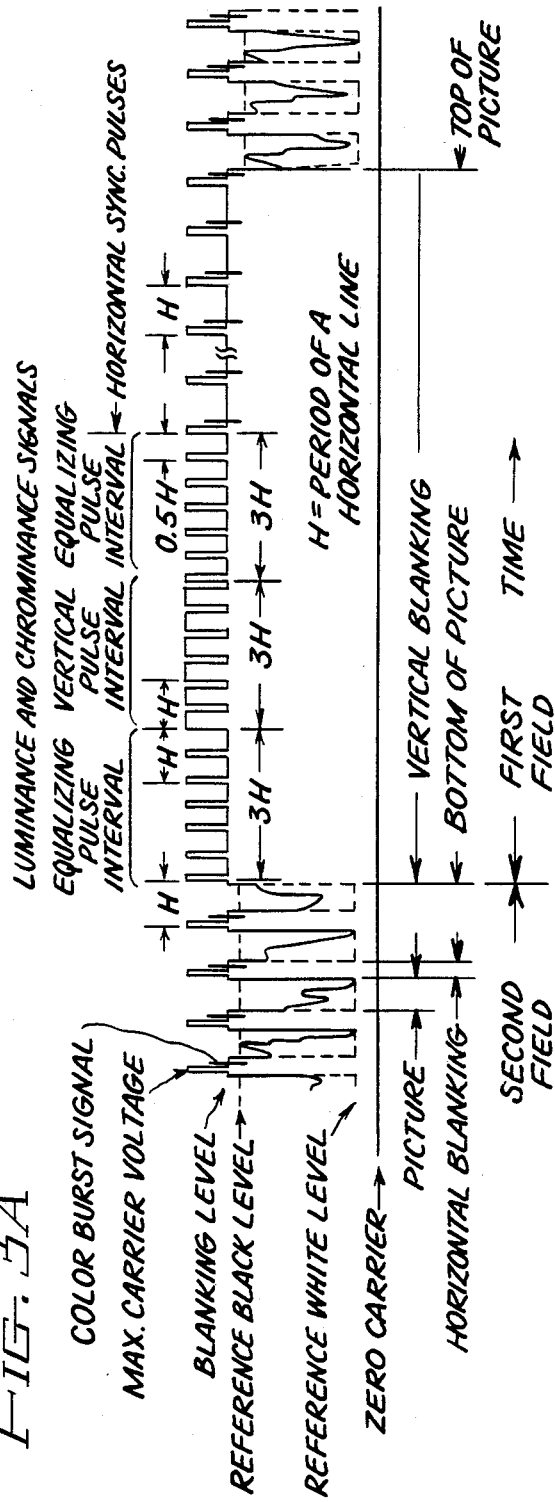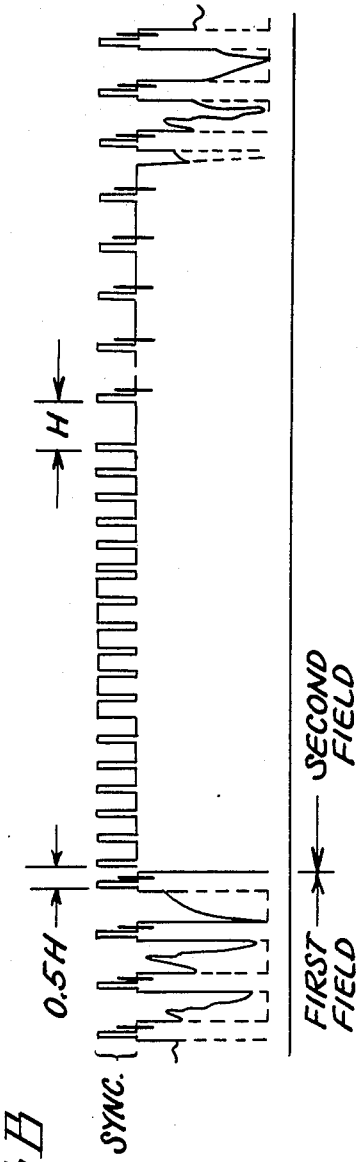

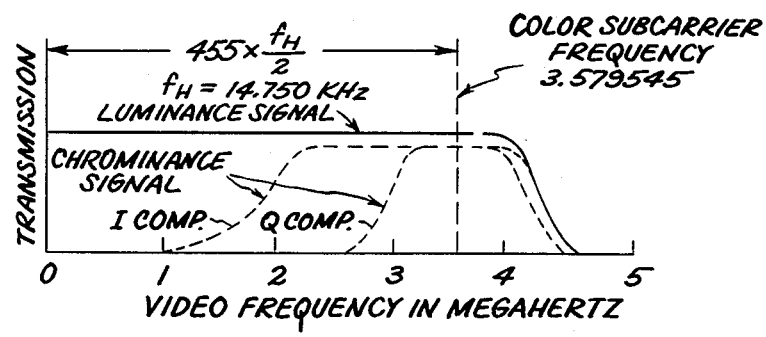
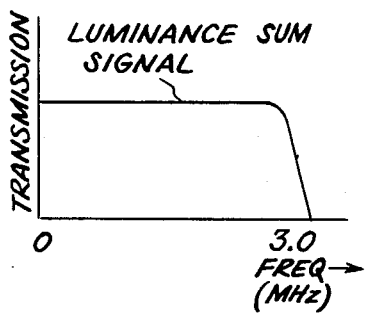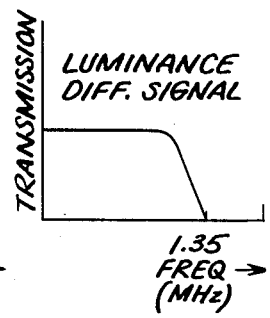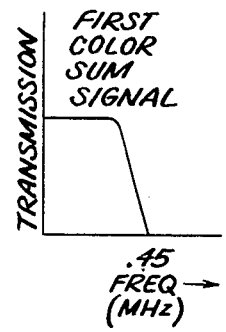
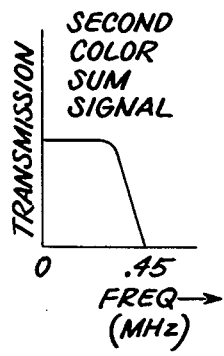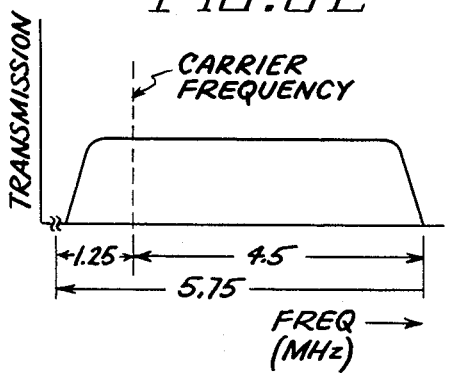

FIG. 11A H. DRIVE — TIME →
FIG. 11B LINE 265 SIG. — RESET
FIG. 11C OUTPUT OF T.E. FLIP-FLOP
FIG. 11D FRAME SYNC. SIGNAL — BLACK LEVEL — 128 CYCLES OF 2.864 MHz — 312 — 313 — 311 — 44 μsec. — 6.5 μsec. — 6.2 μsec.
FIG. 11E COMPARATOR OUTPUT
FIG. 11F EDGE DETECTOR OUTPUT
FIG. 11G FRAME SYNC. PULSE OUTPUT

SYSTEM FOR ENCODING AND DECODING VIDEO SIGNALS

The present invention relates to a system for encoding and decoding video signals to reduce the bandwidth required for the transmission thereof over a transmission channel such as a cable television channel, a broadcast channel or a storage medium.

This patent application is related to patent application Ser. No. 383,067, filed May 28, 1982, now U.S. Pat. No. 4,473,837 and patent application Ser. No. 435,792, filed Oct. 2, 1982, both of which are assigned to the assignee of the present invention.

In a raster scanned television system, the correlation in the horizontal or raster scanned direction automatically results in a low bandwidth signal. Also, a high degree of correlation exists between lines in the vertical direction. Prior art systems of bandwidth reduction converted each pixel to a digital value of a predetermined number of bits with each pixel being assigned the same number of bits. Bandwidth was reduced by reducing the number of bits per pixel by relatively complex digital processes such as transform coding, adaptive differential pulse code modulation, etc. The resulting digital signal was transmitted in digital form. Such systems required large bandwidths, or with reduced bandwidth picture quality was impaired, unless relatively costly processing was utilized.

The present invention takes advantage of the natural correlation in a television picture in the horizontal and vertical directions for bandwidth reduction without significant impairment of the reproduced picture. This is accomplished by processing the television signal for bandwidth reduction in particular ways and transmitting it entirely in the analog domain.

An object of the present invention is to provide a bandwidth reduction system in which two video signals are passed simultaneously over a frequency channel having sufficient bandwidth to pass one video signal.

Another object of the present invention is to provide a substantially two-to-one bandwidth reduction system in which the cost of delivering two video signals is only slightly greater than the cost of delivering a single video signal.

A further object of the present invention is to reformat a television signal so that it cannot be monitored by a conventional television receiver.

In carrying out the invention in one embodiment thereof there is provided a first video signal including a first luminance signal, a first color signal and a second color signal, said first luminance signal, said first color signal and said second color signal each consisting of a plurality of successive lines, each line having a duration of a first predetermined time.

Means are provided for linearly combining in accordance with a first linear relationship the amplitudes of lines of said first luminance signal to obtain a first combined luminance signal.

Means are provided for linearly combining in accordance with a second linear relationship the amplitudes of lines of said first luminance signal to obtain a second combined luminance signal, said second linear relationship being independent of said first linear relationship.

Means are provided for combining in accordance with a third linear relationship the amplitudes of lines of said first color signal to obtain a first combined color signal.

Means are provided for combining in accordance with a fourth linear relationship the amplitudes of lines of said second color signal to obtain a second combined color signal.

Means are provided for limiting the bandwidth of said second combined luminance signal, said first combined color signal and said second combined color signal in relation to the bandwidth of said first combined luminance signal.

Means are provided for compressing the duration of the lines of said first combined luminance signal, said second combined luminance signal, said first combined color signal and said second combined color signal to increase the bandwidth of each of said signals to a first value of bandwidth.

Means are provided for forming a plurality of lines of a first compound video signal, said plurality of lines of said first compound video signal consisting of a first set of alternate lines and a second set of alternate lines, each line of said first set of alternate lines of said first compound video signal being formed by time multiplexing respective compressed lines of said first combined luminance signal, said second combined luminance signal, said first combined color signal and said second combined color signal, the amplitude of each line of said second set of alternate lines of said first compound signal being zero.

A second video signal is provided including a second luminance signal, a third color signal and a fourth color signal, said second luminance signal, said third color signal and said fourth color signal each consisting of a plurality of successive lines, each line having a duration of said first predetermined time.

Means are provided for linearly combining in accordance with a fifth linear relationships the amplitudes of lines of said second luminance signal to obtain a third combined luminance signal.

Means are provided for linearly combining in accordance with a sixth linear relationship the amplitudes of lines of said second luminance to obtain a fourth combined luminance signal.

Means are provided for combining in accordance with a seventh linear relationship the amplitudes of lines of said third color signal to obtain a third combined color signal.

Means are provided for combining in accordance with an eighth linear relationship the amplitudes of lines of said fourth color signal to obtain a fourth combined color signal.

Means are provided for limiting the bandwidth of said fourth combined luminance signal, said third combined color signal and said fourth combined color signal in relation to the bandwidth of said third combined luminance signal.

Means are provided for compressing the duration of the lines of said third combined luminance signal, said fourth combined luminance signal, said third combined color signal and said fourth combined color signal to increase the bandwidth of each of said signals to said first value of bandwidth.

Means are provided for forming a plurality of lines of a second compound video signal, said plurality of lines of said second compound video signal consisting of lines of a first set of alternate lines and a second set of alternate lines, each line of said first set of alternate lines of said second compound video signal being formed by time multiplexing respective compressed lines of said third combined luminance signal, said fourth combined luminance signal, said third combined color signal and said fourth combined color signal, the amplitude of each line of said second set of alternate lines of said second compound video signal being zero.

Means are provided for interleaving the lines of said first set of alternate lines of said first compound video signal and said first set of lines of said second compound video signal to provide a third compound video signal.

The third compound video signal is transmitted over a transmission channel to a receiving station where it is recovered. The first compound video signal is recovered from the third compound video signal and inverse operations are utilized for reconstituting the first luminance signal, the first color signal and the second color signal.

The features which are believed to be characteristic of the present invention are set forth with particularity in the appended claims.

The invention itself, both as to its organization and method of operation, together with further objects and advantages thereof may best be understood by reference to the following description taken in connection with the accompanying drawings in which:

FIGS. 1A, 1B and 1C show in the aggregate a block diagram of apparatus for the processing of a first video signal and a second video, each including luminance and chrominance components into a resultant signal of a bandwidth comparable to the bandwidth of one of the video signals and for the transmission of the resultant signal over a transmission channel of bandwidth normally used for a single video signal.

FIGS. 2A, 2B and 2C show in the aggregate a block diagram of apparatus for receiving the resultant signal from the transmission channel of the apparatus of FIG. 1 and for the processing thereof to reconstitute either one of the first and second video signals.

FIG. 3A is a diagram of the U.S. standard television signal showing the vertical blanking interval of the first field of a frame and the horizontal blanking and scanning lines prior to and subsequent to the vertical blanking interval. The diagram also shows horizontal synchronization pulses, vertical synchronization pulses, equalizing pulses, and color burst signals.

FIG. 3B is a diagram of the U.S. standard television signal showing the blanking interval of the second field of a frame and horizontal blanking and scanning lines prior to and subsequent to the vertical blanking interval. The diagram also shows horizontal synchronization pulses, vertical synchronization pulses, equalizing pulses, and color burst signals.

FIG. 4 shows a diagram of the bands of frequencies occupied by the luminance and chrominance components of a television signal.

Figure 1A:
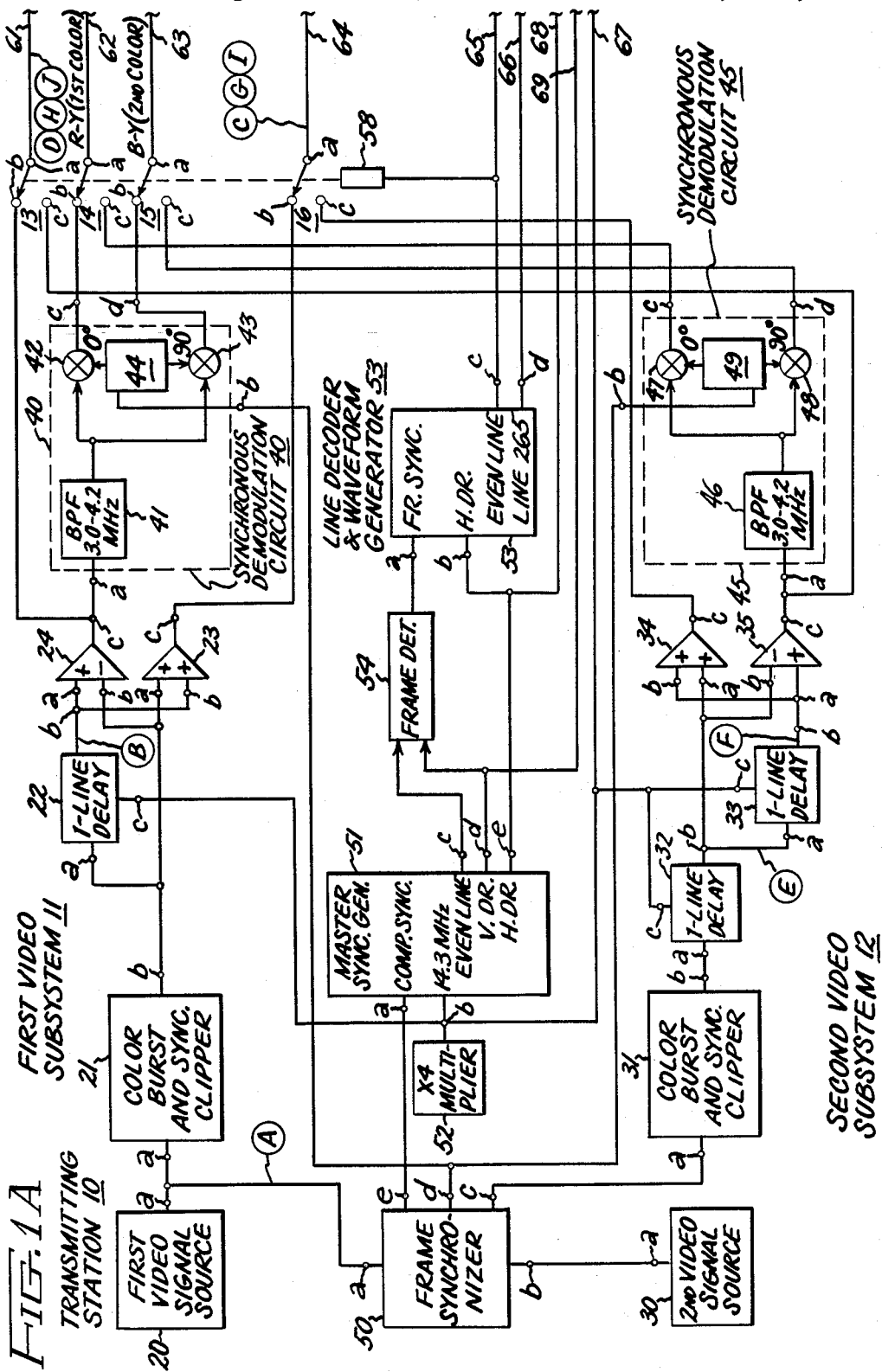

FIGS. 5A–5J are diagrams of the video signals, drawn to a common time scale, occurring at various points in the apparatus of FIGS. 1A–1C. The point of occurrence of a signal of FIGS. 5A–5J in the block diagrams of FIGS. 1A–1C is identified by a literal designation corresponding to the literal designation of the figure. The amplitude of each horizontal line of a first video signal to be processed is symbolically indicated by the designation l with a subscript to indicate the position of the line in the sequence of lines of a frame. The amplitude of each line of a second video signal to be processed is symbolically indicated by the designation l′ with a subscript to indicate the position of the line in the sequence of luminance lines of a frame.

Figure 5A:
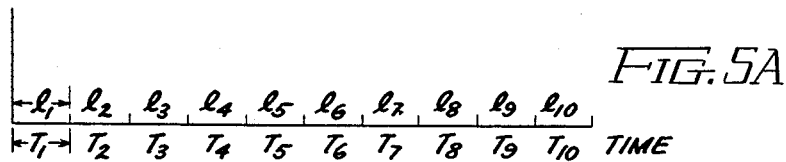

FIG. 5A shows several consecutive lines, $l_1$–$l_{10}$, of the luminance component of a first video signal.

Figure 5B:
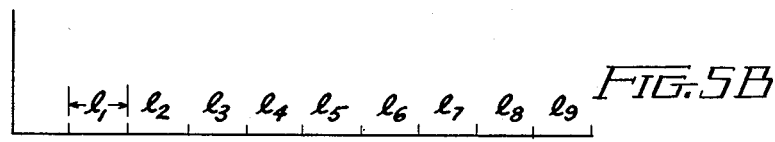

FIG. 5B shows the video signal of FIG. 5A delayed by a period of one line.

Figure 5C:
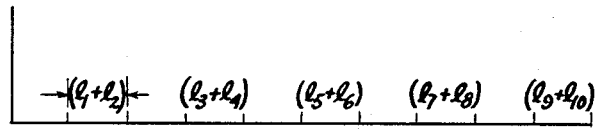

FIG. 5C shows the amplitude summation of successive non-overlapping pairs of lines utilizing the video signal of FIG. 5A and the video signal of FIG. 5B to provide a first combined signal. Successive lines are separated by a blank period equal to the period of a line.

Figure 5D:
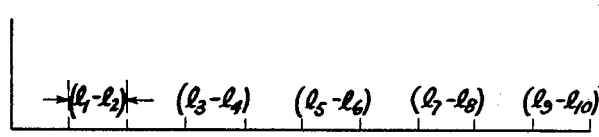

FIG. 5D shows the amplitude difference of successive non-overlapping pairs of lines utilizing the video signal of FIG. 5A and the video signal of FIG. 5B to provide a second combined signal. Successive lines are separated by a blank period equal to the period of one line.

Figure 5E:
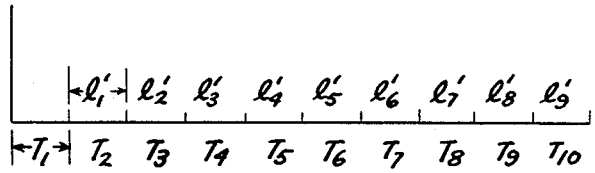

FIG. 5E shows several consecutive lines, $l'_1$–$l'_{10}$, of the luminance component of a second video signal. The second video signal is delayed in relation to the first video signal by the time of one line.

Figure 5F:
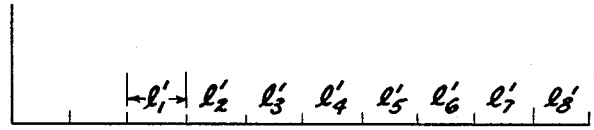

FIG. 5F shows the video signal of FIG. 5E delayed by a period of one line.

Figure 5G:
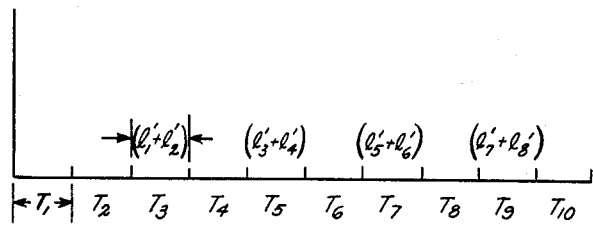

FIG. 5G shows the amplitude summation of successive nonoverlapping pairs of lines utilizing the video signal of FIG. 5E and FIG. 5F to provide a third combined signal. Successive lines are separated by a blank period equal to the period of a line.

Figure 5H:
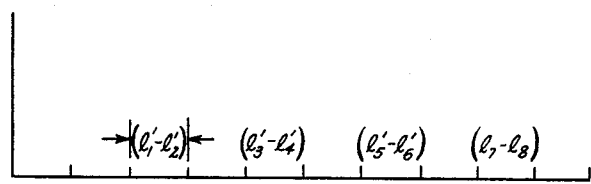

FIG. 5H shows the amplitude difference of successive nonoverlapping pairs of lines utilizing the video signal of FIG. 5E and the video signal of FIG. 5F to provide a fourth combined signal. Successive lines are separated by a blank period equal to the period of one line.

Figure 5I:
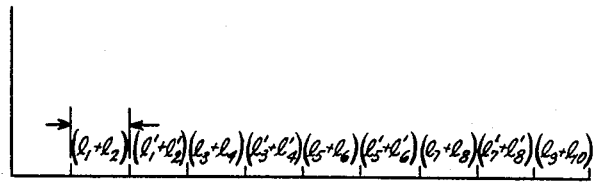

FIG. 5I shows a compound video signal obtained by combining the first combined signal of FIG. 5C and the third combined signal of FIG. 5G.

Figure 5J:
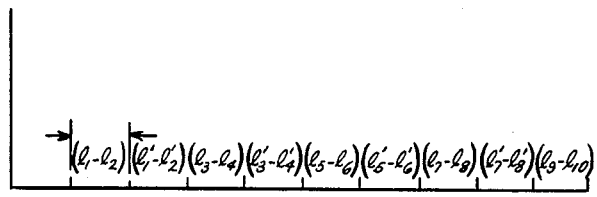

FIG. 5J shows a compound video signal obtained by combining the second combined signal of FIG. 5D and the fourth combined signal of FIG. 5H.

FIG. 6A shows a diagram of the bandwidth limitation of the luminance sum signal of FIG. 5I by filter 151 of FIG. 1B.

FIG. 6B shows a diagram of the bandwidth limitation of the luminance difference signal of FIG. 5J by filter 121 of FIG. 1B.

FIG. 6C shows a diagram of the bandwidth of the first color sum signal on bus 62 by filter 131.

FIG. 6D shows a diagram of the bandwidth of the second color sum signal on bus 62 by filter 141 of FIG. 1B.

FIG. 6E is a diagram of the response of the vestigial sideband filter 137 of the transmission station of FIG. 1.

Figure 7:
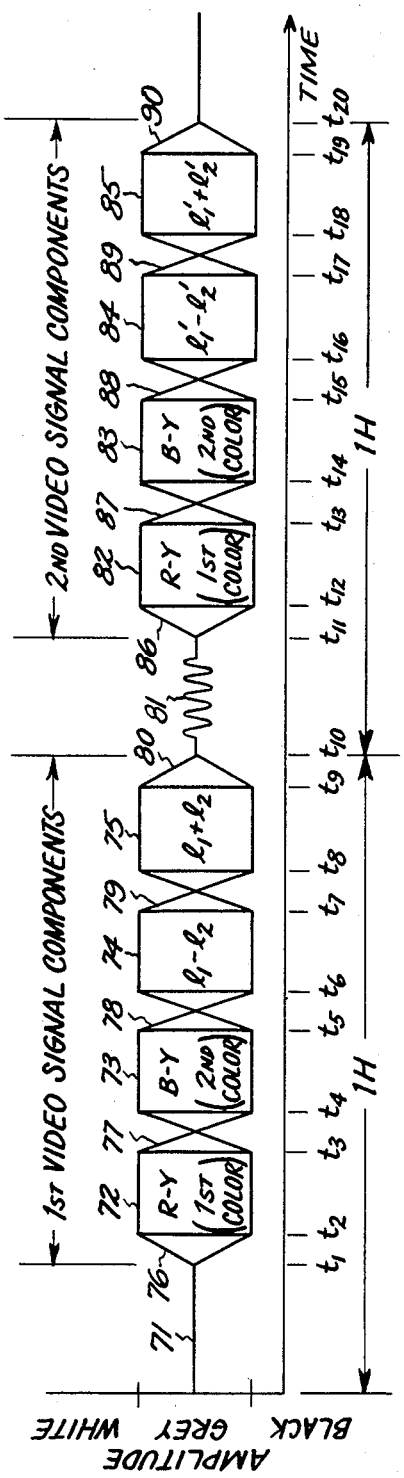

FIG. 7 shows two successive lines of a compound video signal.

Figure 8:
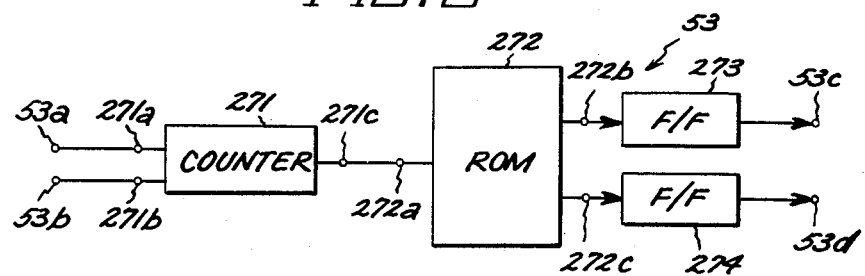

FIG. 8 is a block diagram of the line decoder and waveform generator 53 of the transmission station of FIGS. 1A, 1B and 1C.

Figure 9:
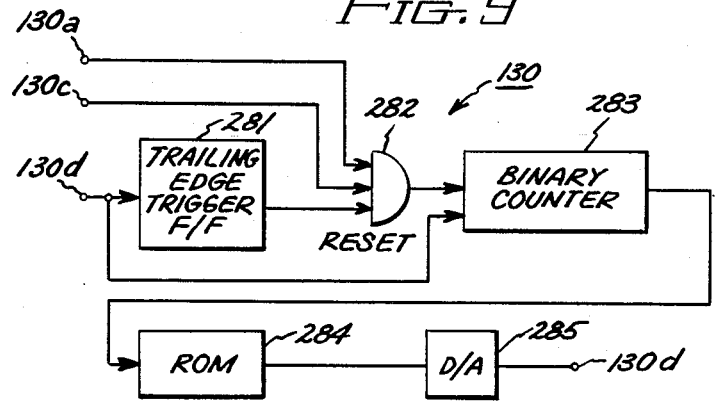

FIG. 9 is a block diagram of the frame sync generator 130 of FIG. 1C.

Figure 2A:
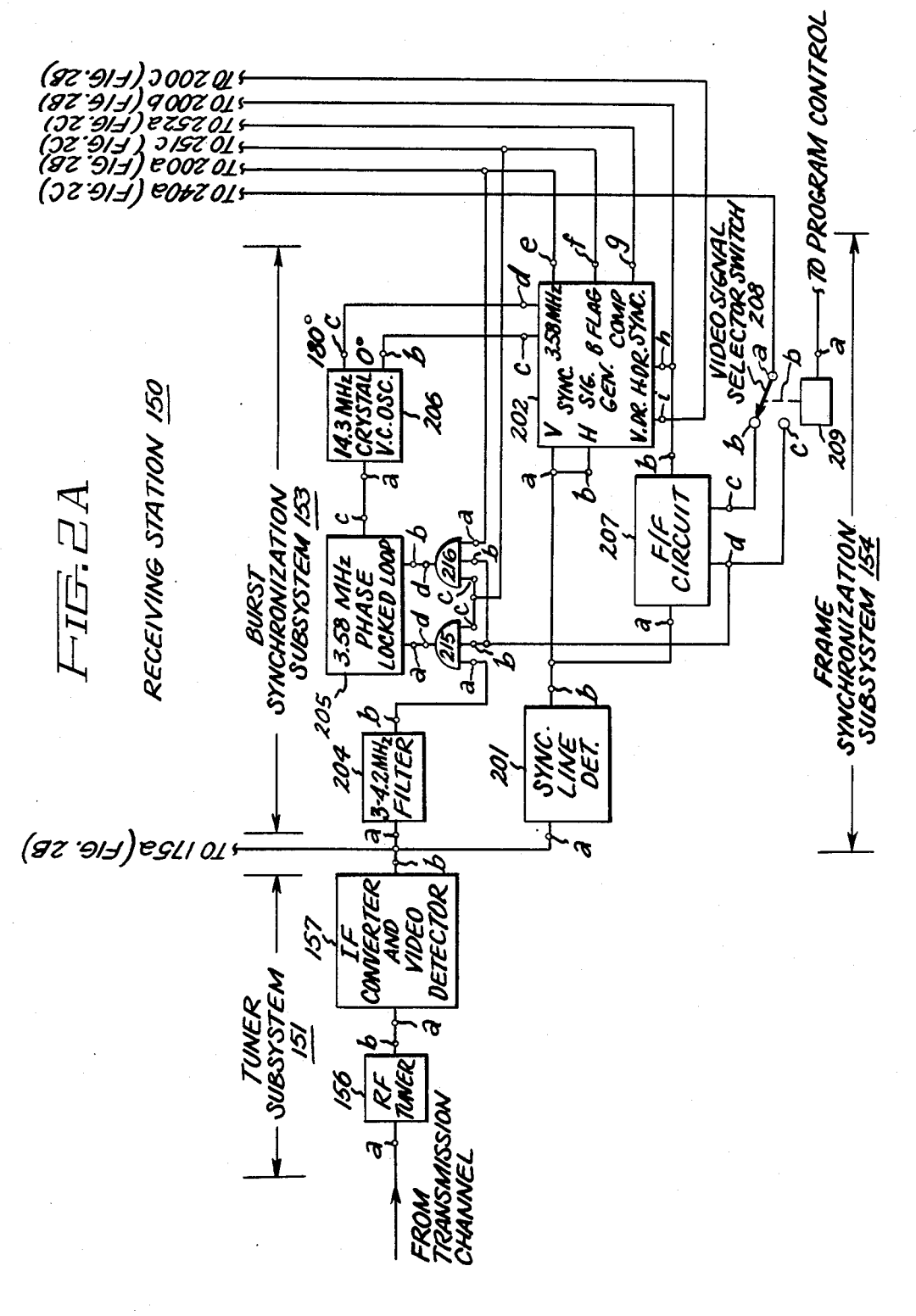
Figure 10:
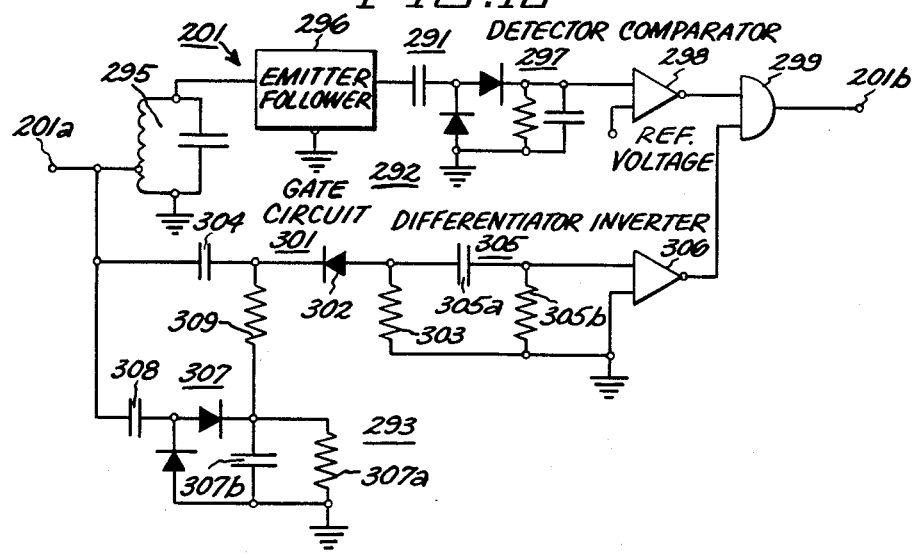

FIG. 10 is a circuit diagram of the sync line detector 201 of FIG. 2A.

FIGS. 11A–11G are diagrams of waveforms drawn to a common time scale useful in explaining the operation of the frame sync generator 130 of FIG. 1C and the sync line detector of FIG. 2A.

Referring now to FIGS. 1A, 1B and 1C, there is provided a transmitting station 10 including a first video subsystem 11 for processing a first video signal, a second video subsystem 12 for processing a second video signal, a bank of four single pole-double throw switches 13, 14, 15 and 16, a third video subsystem 17 for processing the video signals of video subsystems 11 and 12 combined by the switches 13–16, and a carrier subsystem 18 for encoding the video signals processed by the third video subsystem 17 on a carrier.

The first video system 11 includes a first video signal source 20 which provides at its output a standard color television or video signal of the form shown in FIGS. 3A and 3B. The standard television signal includes horizontal synchronizing pulses, vertical synchronizing pulses, horizontal blanking pulses, vertical blanking pulses, color burst signals, and luminance and chrominance signals. Each frame of the television signal includes a pair of interlaced fields as shown in FIGS. 3A and 3B. FIG. 3A is a diagram of the standard television signal showing the vertical blanking interval of the first or odd field of a frame and also showing the horizontal blanking interval and the horizontal scanning lines prior to and subsequent to the vertical blanking interval. FIG. 3B shows a diagram of the second or even field of the standard television signal showing the blanking interval of the second field of a frame and also showing the horizontal blanking interval and the scanning lines prior to and subsequent to the vertical blanking interval. FIG. 4 shows a diagram of the bands of frequencies occupied by the luminance and chrominance components of a complete color picture or video signal. The luminance component is contained in a band of frequencies extending from zero to 4.5 MHz with cutoff at about 4.2 MHz. The frequencies of the luminance signal are centered about even multiples of one-half of horizontal line scanning frequency. In order to represent both hue and saturation, the chrominance signal includes first and second independent components. Conventionally, these two components are called I and Q. The I component consists of sidebands of an in-phase or first color subcarrier modulated in amplitude by a first color signal which are contained in a band of frequencies from about 2 MHz to about 4.2 MHz. The first color signal is a first linear combination of red, green and blue color signals in accordance with U.S. color television standards. The Q component, consists of side bands of a second subcarrier in quadrature phase relationship to the first subcarrier modulated in amplitude by a second color signal which is contained in a band of frequencies from 3.0 MHz to 4.2 MHz approximately centered about the frequency of the subcarrier. The second color signal is a second linear combination of the red, green and blue color signals in accordance with U.S. color television standards. The frequency of the color subcarrier is an odd multiple of one-half of the line scanning frequency of about 14.750 KHz.

The first video system 11 also includes a color burst and sync clipper circuit 21, a one-line delay circuit 22, a summation amplifier 23, and a differential amplifier 24. The color burst and sync clipper circuit 21 has an input terminal 21a, and an output terminal 21b. In response to the television signal applied to its input terminal 21a, the color burst and sync clipper 21 clips or removes the color burst signals and sync pulses from the television signal to provide a video signal at the output terminal 21b in which burst signals and the horizontal and the vertical synchronizing pulses are deleted to facilitate the processing of first video signal. The one-line delay circuit 22 is a delay line, such as a charge coupled delay line, having an input terminal 22a, an output terminal 22b and a clock terminal 22c. The summation amplifier 23 has a pair of input terminals 23a and 23b, and an output terminal 23c. The differential amplifier 24 has a noninverting terminal 24a, an inverting terminal 24b and an output terminal 24c.

The first video subsystem also includes a synchronous demodulator circuit 40 for synchronously demodulating the first and second color components from the color television signal. The synchronous demodulator includes a band pass filter 41, a first demodulator 42, a second demodulator 43 and a phased shifter 44. The synchronous demodulator circuit 40 also includes an input terminal 40a, an input terminal 40b an output terminal 40c and an output terminal 40d. A television signal including color components in the form of modulation on a subcarrier are applied at input terminal 40a. A subcarrier signal of reference phase is applied at input terminal 40b. A first color signal is obtained at output terminal 40c and a second color signal is obtained at terminal 40d. The first color signal is designated R-Y, where R is the signal corresponding to the red component and Y is the sum of the red, blue and green components of the picture represented by the video signal. The second color signal is designated B-Y, where B is the signal corresponding to the blue component of the picture represented by the video signal. The band pass filter 41 with its input terminal connected to input terminal 40a filters the color subcarrier components in the band of 3.0–4.2 MHz of the television signal. The filtered signal is applied to one input of demodulator 42 and to one input of demodulator 43. The phase shifter 42 with its input connected to input terminal 50d of frame synchronizer 50 provides at one output thereof a subcarrier of zero phase which is applied to another input of the first demodulator 42 and also provides at another output thereof a subcarrier of 90° reference phase which is applied to another input of the second demodulator 43. At the output of the first synchronous demodulator 42 which is connected to output terminal 40c is obtained the first color signal of the video signal from source 20. At the output of the second synchronous demodulator 43 which is connected to terminal 40d is obtained the second color signal of the video signal from source 20.

The second video subsystem 12 includes a second video signal source 30 providing a standard color television signal at its output terminal 30a, a color burst and sync clipper circuit 31, a first one-line delay circuit 32, a second one-line delay circuit 33, a summation amplifier 34 and a differential amplifier 35. The color burst and sync clipper circuit 31 has an input terminal 31a and an output terminal 31b. In response to the television signal appearing at its input terminal 31a, the color burst and sync clipper clips or removes the color burst signals and the sync pulses from the television signal to provide a video signal at the outut terminal 31b in which the color burst signals and the horizontal and vertical synchronizing pulses are deleted to facilitate the processing of the second video signal. The one-line delay circuit 32 is a charge delay line, such as a charge coupled delay line, having an input terminal 32a, an output terminal 32b and a clocking terminal 32c. The one-line delay circuit 33 is also a delay line, such as a charge coupled delay line, having an input terminal 33a and an output terminal 33b and a clocking terminal 33c. The summation amplifier 34 has input terminals 34a and 34b and an output terminal 34c. The differential amplifier 35 has a noninverting input terminal 35a, an inverting input terminal 35b and an output terminal 35c.

The first video subsystem also includes a synchronous demodulator circuit 45 for synchronously demodulating the first and second color components from the color television signal. The synchronous demodulator includes a band pass filter 46, a first demodulator 47, a second demodulator 48 and a phased shifter 49. The synchronous demodulator circuit 45 also includes an input terminal 45a, an input terminal 45b, an output terminal 45c and an output terminal 45d. A television signal including color components in the form of modulation on a subcarrier are applied at input terminal 45a. A subcarrier signal of reference phase is applied at input terminal 45b. The first color signal is obtained at output terminal 45c and the second color signal is obtained at terminal 45d. The band pass filter 46 with its input terminal connected to input terminal 45a filters the color subcarrier components of the television signal. The filtered signal is applied to one input of demodulator 47 and to one input of demodulator 48. The phase shifter 49 with its input connected to input terminal 50d of frame synchronizer provides at one output thereof a subcarrier of zero phase which is applied to another input of the first demodulator 47 and also provides at another output thereof a subcarrier of 90° reference phase which is applied to another input of the second demodulator 48. At the output of the first synchronous demodulator 47 which is connected to output terminal 45c is obtained the first color signal of the video signal from source 30. At the output of the second synchronous demodulator 48 which is connected to terminal 45d is obtained the second color signal of the video signal from source 30.

Switches 13–16 are high speed switches such as those fabricated by means of MOSFET circuits. The switch 13 has a pole terminal 13a, a first contact terminal 13b and a second contact terminal 13c. The switch 14 has a pole terminal 14a, a first contact terminal 14b and a second contact terminal 14d. The switch 15 has a pole terminal 15a, a first contact terminal 15b and a second contact terminal 15c. The switch 16 has a pole terminal 16a, a first contact terminal 16b and a second contact terminal 16c.

The transmitting station 10 also includes frame synchronizer 50 having a first input terminal 50a, a second input terminal 50b and output terminals 50c, 50d and 50e. Frame synchronizer 50 functions in response to a first video signal applied to first input terminal 50a from source 20 and to a second video signal applied to second input terminal 50b to provide at the output terminal 40c the second video signal from source 30 with the horizontal lines thereof in synchronism with the horizontal lines of the first video signal. In addition, the frame synchronizer 50 provides at output terminal 50e the composite synchronizing signal of the first video signal from source 20 including the vertical synchronization and horizontal synchronization pulses. Also, the frame synchronizer provides at output terminal 50d a subcarrier signal of 3.58 MHz synchronized with the color burst signals of the first video signal and also in synchronism with the color burst signals of the second video signal at output terminal 50c. The frame synchronizer 50 is a standard component commercially available as Model 2525 from Microtime Company of Bloomfield, Conn.

The transmitting station also includes a master sync generator 51 which has input terminals 51a and 51b, and output terminals 51c, 51d, and 51e and a frequency multiplier 52. The multiplier 52 provides an output of 14.3 MHz in response to the 3.58 MHz signal applied to the input thereof from terminal 50d of frame synchronizer 50. In response to composite sync from terminal 50e of frame synchronizer 50 applied to input terminal 51a and a 14.3 MHz signal obtained from the output multiplier 42 and applied at terminal 51b, the master sync generator 51 provides at output terminals 51c through 51e, respectively, an even line of a frame signal, a vertical drive signal synchronized with the vertical sync pulses of the video signal of source 20, and a horizontal drive signal synchronized with the horizontal synchronizing pulses of the video signal. The master sync generator 51 is a standard component commercially available as Integrated Circuit Type-3252B TV Sync Generator from Fairchild, A Schlumberger Company, of Mountain View, Calif.

The transmitting station 10 also includes a line decoder and waveform generator 53 having input terminals 53a and 53b and having output terminals 53c and 53d and a frame detector 54 for developing a pulse at the output thereof coinciding with the beginning of a frame in response to vertical drive and even line signals from terminals 51c and 51d of master sync generator 51. In response to an output signal from frame detector 54 applied to terminal 53a and horizontal drive pulses from master sync generator 51 applied to input terminal 53b, the line decoder and waveform generator 53 develops a signal at output terminal 53d coincident with the occurrence of line 265 of a frame of the video signal from source 20 and also develops at output terminal 53c a signal which alternates in level every line from a high level on the odd lines to a low level on the even lines of a frame. The line decoder and waveform generator 43 will be described in greater detail below in connection with FIG. 8.

The transmitting station 10 also includes switch controller 58. The input of switch controller 58 is connected to terminal 53c of line decoder and waveform generator 53 and has a linkage indicated by dotted line 58b linking the poles of switches 13–16 to control the position thereof.

The output terminal 20a of the first video source 20 is connected to input terminal 50a of frame synchronizer 50 and also to input terminal 21a of color burst and sync clipper 21. The output terminal 21b of color burst and sync clipper 20 is connected to input terminal 22a of one-line delay circuit 22, to input terminal 23a of summation amplifier 23 and to inverting input terminal 24b of differential amplifier 24. The output terminal 22b of one-line delay circuit 22 is connected to input terminal 23b of summation amplifier 23 and to noninverting terminal 24a of differential amplifier 24. The output terminal 23c of summation amplifier 23 is connected to contact terminal 16b of switch 16. The output terminal 24c of differential amplifier 24 is connected to contact terminal 13b of switch 13 and also is connected to input terminal 40a of synchronous demodulator circuit 40, the output terminals 50c and 40d of which are connected to respective contact terminals 14b and 15b of switches 14 and 15. The input terminal 40b of synchronous demodulator circuit 40 is connected to terminal 50d of frame synchronizer 50.

The output terminal 30a of second video signal source 30 is connected to input terminal 50b of frame synchronizer 50. Output terminal 50c of frame synchronizer 50 is connected to input terminal 31a of color burst and sync clipper 31. The output terminal 31b is connected to input terminal 32a of one-line delay circuit 32. The output terminal 32b of one-line delay circuit 32 is connected to terminal 34a of summation amplifier 34, to inverting terminal 35b of differential amplifier 35, and to input terminal 33a of one-line delay circuit 33. The output terminal 33b of one-line delay circuit 33 is connected to input terminal 34b of summation amplifier 34 and to noninverting terminal 35a of differential amplifier 35. The output of summation amplifier 35c is connected to contact terminal 16c of switch 16. The output terminal 35c of differential amplifier 35 is connected to contact terminal 13c of switch 13 and is also connected to input terminal 45a of synchronous demodulator circuit 45, the output terminals 45c and 45d of which are connected to respective contact terminals 14c and 15c of switches 14 and 15. The input terminal 45b of synchronous demodulator circuit 45 is connected to terminal 50d of frame synchronizer 50.

The operation of the first and second video subsystems 11 and 12 of the transmitting station 10 of FIG. 1A will now be described in connection with FIGS. 5A–5J which show diagrams of video signals drawn to a common time scale and occurring at various points in the apparatus of FIG. 1. The point of occurrence of a signal of FIGS. 5A–5J in block diagram of FIG. 1 is identified by a literal designation corresponding to the literal designation of the figure. The amplitude of each line of the first video signal to be processed is symbolically indicated by the letter l with a subscript to indicate the position of the line in the sequence of lines of a frame. The amplitude of each line of the second video signal to be processed is symbolically indicated by the letter l with a subscript to indicate the position of the line in the sequence of lines of a frame. The video signal appearing at terminal 20a at the output of the first video source 20 is shown in FIG. 5A. FIG. 5A shows several consecutive lines $l_1$ through $l_{10}$ of the first video signal. The lines $l_1, l_3, l_5, l_7, l_9$, etc. form a first set of alternate lines. The lines $l_2, l_4, l_6, l_8, l_{10}$ etc. form a second set of alternate lines. Each of the lines of the first video signal has the color burst signal and the horizontal sync pulses thereof clipped by the color burst and sync clipper 21. The video signal is then delayed by a period of one line by the one-line delay circuit 22, as shown in FIG. 5B. The delayed signal of FIG. 5B is applid to one terminal 23b of summation amplifier 23 and also to the noninverting terminal 24a of the differential amplifier 24. The undelayed video signal shown in FIG. 5A is applied to the other terminal 23a of the summation amplifier 23 and also to the other terminal 24b of the differential amplifier. Thus, at the output terminal 23c of the summation amplifier 23, a signal is obtained which is the sum of successive pairs of lines of the first video signal and similarly at the output terminal 24c of the differential amplifier 24 a video signal is obtained which is the difference of successive pairs of lines. The sequence of sums would be $l_1+l_2, l_2+l_3, l_3+l_4$, etc. and similarly the sequence of differences would be $l_1-l_2, l_3-l_4, l_5-l_6$, etc. The sequences of nonoverlapping pairs of successive lines, $l_1+l_2, l_3+l_4, l_5+l_6$, etc. and $l_1-l_2, l_3-l_4, l_5-l_6$, etc. are utilized. The first sequence is obtained by operating the pole of the switch 16 so that it makes contact with the contact terminal 14b during the intervals $T_2, T_4, T_6$, etc., of the lines $l_2, l_4, l_6$, etc., respectively. Thus, at the pole terminal 16a of switch 16, a video signal appears, referred to as the first combined signal, having the amplitude $l_1+l_2$ during time $T_2$, the amplitude $l_3+l_4$ during time $T_4$, the amplitude $l_5+l_6$ during time $T_6$, etc. as shown in FIG. 5C. The second sequence is obtained by operating pole of switch 13 so that it makes contact with contact terminal 13b during the time of occurrence of lines $l_2, l_4, l_6$, etc. at times $T_2, T_4, T_6$, etc., respectively. Thus, at the pole terminal 13a of switch 13, a video signal appears, referred to as the second combined signal, having amplitude $l_1-l_2$ during time $T_2$, the amplitude $l_3-l_4$ during time $T_4$, the amplitude $l_5-l_6$ during time $T_6$, etc. as shown in FIG. 5D. These results are obtained by the action of the controller 58 which alternates the position of the poles of switches 13 and 16, between a first contact position and a second contact position in response to the control signal obtained from terminal 53c of the line decoder and waveform generator 53.

The second video signal from the second video signal source 30 is applied to the input terminal 50b of the frame synchronizer 50 which synchronizes the horizontal lines of the second video signal with the lines of the first video signal. The output of the frame synchronizer 50 is applied to the color burst and sync clipper 31 which clips the color burst signal and the horizontal and the vertical pulses to provide at the output thereof the second video signal with the horizontal sync pulses and the color burst signal removed. The second video signal shown in FIG. 5E is delayed by the period of one line by the one line delay circuit 32 so that line $l'_1$ thereof occurs during time $T_2$, that is, during the time of occurrence of line $l_2$ of the first video signal and line $l'_2$ occurs during time $T_3$, $l'_3$ occurs during time $T_4$, etc. The delayed signal of FIG. 5E is applied to one terminal 34a of summation amplifier 34, to input terminal 33a of one-line delay circuit 33 and to the inverting terminal 35b of differential amplifier 35. The output of the one-line delay circuit 33 is connected to input terminal 34b of summation amplifier 34 and to the noninverting terminal 35a of differential amplifier 35. Thus, at the output of the summation amplifier 34, a signal is obtained which is the sum of successive pairs of lines of the second video signal and similarly at the output terminal of the differential amplifier 35 a video signal is obtained which is the difference of successive pairs of lines of the second video signal. The sequence of sums would be $l'_1+l'_2, l'_2+l'_3, l'_3+l'_4$, etc. and similarly the sequence of the difference would be $l'_1-l'_2, l'_2-l'_3, l'_3-l'_4$, etc. The sequence of $l'_1+l'_2, l'_3+l'_4, l'_5+l'_6$, etc. and the sequence of $l'_1-l'_2, l'_3-l'_4, l'_5-l'_6$, etc. are utilized. As mentioned above, during the intervals $T_2, T_4, T_6$, etc. the poles of switches 13 and 16 contact the first contact terminals 13b and 16b, respectively, of switches 13 and 16. Accordingly, during these times no signal from the output of the summation amplifier 34 and the differential amplifier 35 appears at the pole terminals 13a and 16a of the switches 13 and 16. During times $T_1, T_3, T_5, T_7$, the pole terminals of the switches 13 and 16 contact the second terminals 13c and 16c, respectively, of switches 13 and 16. Accordingly, at these times a video signal appears at the output of the summation amplifier 34 and also at pole terminal 16a of switch 16 as shown in FIG. 5G and referred to as the third combined signal. The signal $l'_1+l'_2$ occurs during time $T_3$. No signal occurs during time $T_4$. The signal $l'_3+l'_4$ occurs during time $T_5$. No signal occurs during time $T_6$. The signal $l'_5+l'_6$ occurs during time $T_7$. No signal occurs during time $T_8$, etc. Also, during the time periods $T_3, T_5, T_7$, etc., the output of the differential amplifier 35 appears at the pole terminal 13a of switch 13 as shown in FIG. 5H and referred to as a fourth combined signal. The difference signal $l'_1-l'_2$ occurs during time $T_3$. No signal appears during time $T_4$. The difference signal $l'_3-l'_4$ occurs during time $T_5$. No signal occurs during time $T_6$. The difference signal $l'_5-l'_6$ occurs during the time $T_7$. No signal occurs during time $T_8$, etc. Thus, at the pole terminal 16a of switch 16, appears the summation signal shown in FIG. 5I. The sequence of FIGS. 5I is $l'_1+l'_2$, $l'_1-l'_2$, $l_3+l_4$, $l'_3$, $l'_4$, etc. occurring during times $T_2$, $T_3$, $T_4$, etc., respectively. The video signal appearing at the pole terminal 13a of switch 13 is shown in FIG. 5J. The sequence is $l_1-l_2$, $l'_1-l'_2$, $l_3-l_4$, $l'_3-l'_4$, etc. occurring at times $T_2$, $T_3$, $T_4$, $T_5$, etc., respectively.

Thus, at terminal 16a of switch 16, appears a compound video signal consisting of sums of nonoverlapping pairs of lines of the luminance component of the first video signal interleaved with sums of nonoverlapping pairs of lines of the luminance component of the second video signal. As the color subcarrier is an odd harmonic of one-half of the line scanning frequency, the side bands of the color subcarrier containing the chrominance information occur at odd harmonics of the line scanning frequency. Hence, they are canceled by the summation amplifiers 23 and 34 and thus only the luminance components of the first and second video signals appears at terminal 16a. Also, at pole terminal 13a, another composite video signal appears consisting of differences of nonoverlapping pairs of lines of the luminance component of the first video signal interleaved with the differences of nonoverlapping pairs of lines of the luminance component of the second video signal. As the color sidebands occur at odd harmonics of one half of the line scanning frequency, the sideband signals appearing on a pair of adjacent lines are added in the subtraction process. Thus, both a luminance difference signal and a color sideband summation signal appears at this terminal. The luminance signal is limited by a low pass filter to frequencies less than 1.35 MHz, as shown in FIG. 6B, thereby eliminating the color sidebands from the luminance signal, as will be described below in connection with FIG. 1B.

The first color sideband signal appearing at terminal 24c differential amplifier 24 is also applied to input terminal 40a of synchronous demodulator circuit 40. The signal is filtered by the band pass filter 41 to provide a color sideband signal in which successive pairs of lines of the signal are summed. The output of the filter 41 is applied to the synchronous detectors 42 and 43 which synchronously demodulate the color sideband signal to provide at output terminal 40c a first color combined signal and to provide at terminal 40d a second color combined signal. The first color combined signal consists of a sequence of sums of two successive lines of the first color signal. Similarly, the second color combined signal appearing at output terminal 40d consist of a sequence of sums of two successive lines of the second color combined signal.

The second color sideband signal appearing at terminal 35c of differential amplifier 34 is also applied to input terminal 45a of synchronous demodulator circuit 45. The signal is filtered by the band pass filter 46 to provide a color sideband signal in which successive pairs of lines of the signal are summed. The output of the filter 46 is applied to the synchronous detectors 47 and 48 which synchronously demodulate the color sideband signal to provide at output terminal 45c a third color combined signal and to provide at terminal 45d a fourth color combined signal. The third color combined signal consists of a sequence of sums of two successive lines of the third color signal. Similarly, the fourth color combined signal appearing at output terminal 45d consist of a sequence of sums of two successive combined signals.

The controller 58 alternates the position of the poles of switches 14 and 15 between a first contact position and a second contact position in response to the control signal obtained from terminal 53c of the line decoder and waveform generator 53. Thus, at terminal 14a of switch 14, appears a compound video signal consisting of sums of nonoverlapping pairs of lines of the first color component of the first video signal interleaved with sums of nonoverlapping pairs of lines of the first color component of the second video signal. Also, at pole terminal 15a of switch 15 another compound video signal appears consisting of sums of nonoverlapping pairs of lines of the second color component of the first video signal interleaved with the sums of nonoverlapping pairs of lines of the second color component of the second video signal.

Bus 61 is connected to pole terminal 13a of switch 13 and provides the compound luminance difference signal of FIG. 5J. Bus 62 is connected to pole terminal 14a of switch 14 and provides a compound first color signal. Bus 63 is connected to pole terminal 15a of switch 15 and provides a compound second color signal. Bus 64 is connected to the pole terminal 16a of switch 16 and provides a compound luminance sum signal of FIG. 5I. Bus 65 is connected to terminal 53c of line decoder and waveform genertor 53 and provides an even line signal. Bus 66 is connected to terminal 53d of line decoder and waveform generator 53 and provides a line 265 signal. Bus 67 is connected to terminal 51b of master sync generator 51 and provides a 14.32 MHz signal. Bus 68 is connected to terminal 51e of master sync generator 51 and provides a horizontal drive signal. Bus 69 is connected to terminal 51d of master sync generator 51 and provides a vertical drive signal.

The function of the third video subsystem 17 shown in FIGS. 1B and 1C is to convert the analog signals on buses 61, 62, 63 and 64 of FIG. 1A into a compound video signal appearing at the output terminal 100 of the third video subsystem 17. The two successive lines of the compound video signal are shown in FIG. 7 to which reference is now made.

FIG. 7 shows a schematic diagram of amplitude verses time of two successive lines of the compound video signal. The black, gray and white levels of the signals are indicated on the amplitude coordinate of the diagram. The first line of the compound signal occurring from the time $t_0$ to time $t_{10}$ includes information from two adjacent lines of a first video signal. The second line of the compound signal occurring from time $t_{10}$ to time $t_{20}$ includes information from two adjacent lines of a second video signal. The first line of the compound signal includes ten components 71–80. The first component 71 is at gray level amplitude and occurs during the time $t_0$ to $t_1$. The second component 72 is one line of the signal on bus 62 which has been bandwidth limited and then compressed from a line interval to the interval from $t_2$ to $t_3$. The amplitude of component 72 varies between black and white levels. The third component 73 is one line of the signal on bus 63 which has been bandwidth limited and then compressed from a line interval to the interval from $t_4$ to $t_5$. The amplitude of component 73 varies between black and white level. The fourth component 74 is one line of the signal on bus 61 which has been bandwidth limited and then compressed from a line interval to the interval from $t_6$ to $t_7$.

The amplitude of component 74 varies between black and white levels. The fifth component 75 is one line of the signal on bus 64 which has been bandwidth limited and then compressed from a line interval to the interval from $t_8$ to $t_9$. The amplitude of the signal varies between black and white levels.

The sixth component 76 is generated in the third video subsystem 17 and is inserted in the interval from $t_1$ to $t_2$ between the first component 71 and the second component 72 to effect a smooth transition from the terminal level of the first component 71 to the initial level of the second component 72. Similarly, signal components 77, 78, 79 and 80 are inserted in intervals $t_3$ to $t_4$, $t_5$ to $t_6$, $t_7$ to $t_8$, and $t_9$ to $t_{10}$, respectively, to effect a smooth transition in amplitude from the terminal level of one component of signal to the initial level of the succeeding component of signal to eliminate sharp transitions between signal components which would produce undesired cross-talk between the signals.

While in the diagram the time intervals $t_2$ to $t_3$, $t_4$ to $t_5$, $t_6$ to $t_7$, $t_8$ to $t_9$ representing the intervals of the components 72, 73, 74 and 75 of the compound signal, respectively, for reasons of convenience are shown equal, they are not equal. The interval $t_8$ to $t_9$ is greater than the interval $t_6$ to $t_7$. The interval $t_6$ to $t_7$ is greater than the interval $t_4$ to $t_5$ and also is greater than the interval $t_2$ to $t_3$. Also, while the time intervals occupied by the components 76, 77, 78, 79 and 80 are shown equal, they are much smaller than any of the time intervals occupied by the components 72, 73, 74 and 75. Reference is made to Table I for the time intervals occupied by the various components of the compound signal in accordance with one embodiment of the present invention.

The second line of the compound signal also includes ten components 81–90. The first component 81 is a gray level signal on which has been superimposed several cycles of a 3.58 MHz reference signal and occurs during the time interval $t_{10}$ to $t_{11}$. The second component 82 is one line of the signal on bus 62 which has been bandwidth limited and then compressed from a line interval to the interval from $t_{12}$ to $t_{13}$. The amplitude of component 82 varies between black and white levels. The third component 83 is one line of the signal on bus 63 which has been bandwidth limited and then compressed from a line interval to the interval from $t_{14}$ to $t_{15}$. The amplitude of component 83 varies between black and white level. The fourth component 84 is one line of the signal on bus 61 which has been bandwidth limited and then compressed from a line interval to the interval from $t_{16}$ to $t_{17}$. The amplitude of component 84 varies between black and white levels. The fifth component 85 is one line of the signal on bus 64 which has been bandwidth limited and then compressed from a line interval to the interval from $t_{18}$ to $t_{19}$. The amplitude of the signal varies between black and white levels.

The sixth component 86 is generated in the third video subsystem 17 (FIG. 1C) and is inserted in the interval from $t_{11}$ to $t_{12}$ between the first component 81 and the second component 82 to effect a smooth transition from the terminal level of the first component 81 to the initial level of the second component 82. Similarly, signal components 87, 88, 89, and 90 are inserted in intervals $t_{13}$ to $t_{14}$, $t_{15}$ to $t_{16}$, $t_{17}$ to $t_{18}$, $t_{19}$ to $t_{20}$, respectively, to effect a smooth transition in amplitude from the terminal level of one component of signal to the initial level of the succeeding component of signal to eliminate sharp transitions between signal components which would produce undesired cross-talk between the signals. Time intervals $t_0$ to $t_{11}$, $t_{11}$ to $t_{12}$, $t_{12}$ to $t_{13}$, $t_{13}$ to $t_{14}$, $t_{14}$ to $t_{15}$, $t_{15}$ to $t_{16}$, $t_{16}$ to $t_{17}$, $t_{17}$ to $t_{18}$, $t_{18}$ to $t_{19}$, $t_{19}$ to $t_{20}$ are equal to time intervals $t_0$ to $t_1$, $t_1$ to $t_2$, $t_2$ to $t_3$, $t_3$ to $t_4$, $t_4$ to $t_5$, $t_5$ to $t_6$, $t_6$ to $t_7$, $t_7$ to $t_8$, $t_8$, to $t_9$, $t_9$ to $t_{10}$, respectively.

The inputs appearing on lines 61, 62, 63 and 64 are analog inputs. The output of the third video subsystem 17 (FIG. 1C) appearing on output terminal 100 is an analog output. The signals on buses 61, 62, 63 and 64 are bandwidth limited and then converted into digital signals which are processed and inserted into the time intervals described above in connection with FIG. 7. The gray level components, the interpolated components, and the color burst components are internally generated in the subsystem of FIG. 1C in digital form. All of the signals are multiplexed in digital form to constitute a compound signal in digital form which is then converted to an analog signal. The analog signal is filtered to provide the compound signal shown in FIG. 7.

Referring now particularly to FIG. 1B, the third video subsystem 17 of the transmission apparatus 10 includes four processing channels 91, 92, 93 and 94. Channel 91 processes the analog signal appearing on bus 61 into a time compressed and time positioned digital signal which appears on output terminal 95. Channel 92 processes the analog signal appearing on the bus 62 into a time compressed and time position digital signal which appears on terminal 96. Channel 93 processes the analog signal appearing on bus 63 into a time compressed and time positioned digital signal which appears on terminal 97. Channel 94 processes the analog signal appearing on bus 64 into a time compressed and time positioned digital signal which appears on terminal 98.

The channel 91 comprises a low-pass filter 121, an analog-to-digital converter 122, a first switch 123, a first shift register 124, a second shift register 125, and a second switch 126. The low-pass filter 121 having a cutoff frequency of 1.35 MHz, as shown in FIG. 6B, has an input terminal 121a and an output terminal 121b. Analog-to-digital converter 122 converts the analog signal at input terminal 122a into a digital signal at its output terminal 122b. Each line of the signal is divided into 221 elements or values in response to a $6/5 \times 3.58$ MHz clocking signal applied at control terminal 122c thereof and each value has a resolution of 256 levels represented by eight bits. The first switch 123 has a pole terminal 123a consisting of eight lines, a first contact terminal 123b consisting of eight lines, a second contact terminal 123c consisting of eight lines. The first shift register 124 has eight channels and has an input terminal 124a consisting of eight lines, each line connected to the input of a respective channel, an output terminal 124b consisting of eight output lines, each line connected to the output of a respective channel, a control or clocking terminal 124c consisting of eight lines, each line connected to a respective channel for clocking the channels of the shift register at one rate of $6/5 \times 3.58$ MHz during a particular line time and a control or clocking terminal 124d consisting of eight lines, each line connected to a respective channel for clocking the channels at another rate of $4 \times 3.58$ MHz during another particular line time. The second shift register 125 is identical to the first shift register 124 and has an input terminal 125a, an output terminal 125b, a pair of clocking control terminals 125c and 125d. The second switch 126 has a pole terminal 126a consisting of eight lines, a first contact terminal 126*b* consisting of eight lines and a second contact terminal 126*c* consisting of eight lines.

The channel 92 comprises a low-pass filter 131, an analog-to-digital converter 132, a first switch 133, a third shift register 134, a fourth shift register 135, and a fourth switch 136. The low-pass analog filter 131 having a cutoff frequency of 0.45 MHz, as shown in FIG. 6C, has an input terminal 131*a* and an output terminal 131*b*. The analog-to-digital converter 132 has an input terminal 132*a*, an output terminal 132*b* consisting of eight output lines corresponding to eight bits of a binary word and a control terminal 132*c*. The analog-to-digital converter 132 converts the analog signal at input terminal 132*a* into a digital signal at its output terminal 132*b*. Each line of the signal is divided into 74 elements or values in response to a $2/5 \times 3.58$ MHz clocking signal applied at control terminal 132*c* and each value has a resolution of 256 levels represented by eight bits. The third switch 133 has a pole terminal 133*a* consisting of eight lines, a first contact terminal 133*b* consisting of eight lines, and a second contact terminal 133*c* consisting of eight lines. The third shift register 134 has eight channels and has an input terminal 134*a* consisting of eight lines, each line connected to the input of a respective channel, an output terminal 134*b* consisting of eight lines, each line connected to the output of a respective channel, a control or clocking terminal 134*c* consisting of eight lines, each line connected to a respective channel for clocking the channels at one rate of $2/5 \times 3.58$ MHz, and a control of clocking terminal 134*d* consisting of eight lines, each line connected to a respective channel for clocking the channels at another rate of $4 \times 3.58$ MHz. The fourth shift register 135 is identical to the third shift register and has an input terminal 135*a*, an output terminal 135*b* and a pair of clocking control terminals 135*c* and 135*d*. The fourth switch has a pole terminal 136*a* consisting of eight lines, a first contact terminal 136*b* consisting of eight lines, and a second contact terminal 136*c* consisting of eight lines.

The channel 93 comprises a low-pass filter 141, an analog-to-digital converter 142, a fifth switch 143, a fifth shift register 144, a sixth shift register 145, and a sixth switch 146. The filter 141 having a cutoff frequency of 0.45 MHz, as shown in FIG. 6D, has an input terminal 141*a* and an output terminal 141*b*. The analog-to-digital converter 142 has an input terminal 142*a*, an output terminal 142*b* consisting of eight output lines corresponding to eight bits of a binary word and a control terminal 142*c*. The analog-to-digital converter 142 converts the analog signal at input terminal 142*a* into a digital signal at its output terminal 142*b*. Each line of the signal is divided into 74 elements or values in response to a $2/5 \times 3.58$ MHz clocking signal applied at control terminal 142*c* and each value has a resolution of 256 levels represented by eight bits. The fifth switch 143 has a pole terminal 143*a* consisting of eight lines, a first contact terminal 143*b* consisting of eight lines and a second contact terminal 143*c* consisting of eight lines. The fifth shift register 144 has eight channels and has an input terminal 144*a* consisting of eight lines, each line being connected to the input of a respective channel, an output terminal 144*b* consisting of eight lines, each line connected to the output of a respective channel, a control or clocking terminal 144*c* consisting of eight lines, each line connected to a respective channel for clocking the channels at one rate of $2/5 \times 3.58$ MHz and a control or clocking terminal consisting of eight lines, each line connected to a respective channel for clocking the channels at another rate of $4 \times 3.58$ MHz. The sixth shift register 145 is identical to the fifth shift register 144 and has an input terminal 145*a*, an output terminal 145*b*, a pair of clocking terminals 145*c* and 145*d*. The sixth switch 146 has a pole terminal 146*a* consisting of eight lines, a first contact terminal 146*b* consisting of eight lines, and a second contact terminal 146*c* consisting of eight lines.

The channel 94 comprises a low-pass filter 151, an analog-to-digital converter 152, a seventh switch 153, a seventh shift register 154, an eighth shift register 155, and an eighth switch 156. The low-pass filter 151 having a cutoff frequency of 3.0 MHz, as shown in FIG. 6A, has an input terminal 151*a* and an output terminal 151*b*. The analog-to-digital converter 152 has an input terminal 152*a*, an output terminal 152*b* consisting of eight output lines corresponding to eight bits of a binary word and a controlled terminal 152*c*. The analog-to-digital converter 152 converts an analog signal at its input terminal 152*a* into a digital signal at its output terminal 152*b*. Each line of the signal is divided into 495 elements or values in response to a $8/3 \times 3.58$ MHz clocking signal applied at control terminal 152*c* and each value has a resolution of 256 levels represented by eight bits. The seventh switch 153 has a pole terminal 153*a* consisting of eight lines, a first contact terminal 153*b* consisting of eight lines, and a second contact terminal 153*c* consisting of eight lines. The seventh shift register 154 has eight channels and has an input terminal 154*a* consisting of eight lines, each line being connected to the input of a respective channel, an output terminal 154*b* consisting of eight lines, each line connected to the output of a respective channel, a control or clocking terminal 154*c* consisting of eight lines, each line connected to a respective channel for clocking the channels at one rate of $8/3 \times 3.58$ MHz, and a control or clocking terminal 154*d* consisting of eight lines, each line connected to a respective channel for clocking the channels at another ate of $4 \times 3.58$ MHz. The eighth shift register 155 is identical to the seventh shift register 154 and has an input terminal 154*a*, an output terminal 154*b*, a pair of clocking control terminals 155*c* and 155*d*. The eighth switch 156 has a pole terminal 156*a* consisting of eight lines, a first contact terminal 156*b* consisting of eight lines, and a second contact terminal 156*c* consisting of eight lines.

The third video subsystems 17 also includes a timing generator 160 having input terminals 160*a*, 160*b* and 160*c*, and output terminals 160*e*–160*x* and 160*a'*–160*e'*. Terminal 160*a* is connected to line 66 on which clocking signals of 14.32 MHz appears. Terminal 160*b* is connected to line 67 on which horizontal drive signal appears. Terminal 160*c* is connected to line 68 on which vertical drive signal appears. Terminal 160*e* provides a continuous clocking signal of frequency $8/3$ $f_c$ (i.e. $8/3 \times 3.58$ MHz). Terminal 106*f* provides a continuous clocking signal of frequency $2/5$ $f_c$. Terminal 160*g* provides a continuous clocking signal of frequency $2/5$ $f_c$. Terminal 160*h* provides a continuous clocking signal of frequency $6/5$ $f_c$. Terminals 160*j*, 160*l*, 160*n* and 160*p*, provide clocking signals of frequencies $8/3$ $f_c$, $2/5$ $f_c$, $2/5$ $f_c$, $6/5$ $f_c$, respectively, during one line time. Terminals 160*i*, 160*k*, 160*n* and 160*o* provide clocking signals of frequencies $8/3$ $f_c$, $2/5$ $f_c$, $2/5$ $f_c$ $6/5$ $f_c$, respectively, during a succeeding line time. Output terminals 160*q*–160*x* provide clocking signals of frequency $4 \times f_c$ at particular times during successive two line periods which will be further explained in connection with a description of the operation of the third video subsystem. Terminal 160a' provides a controlled clocking signal of 14.32 MHz to gray level ROM 110 (FIG. 1C). Terminal 160b' provides a controlled clocking signal of 14.32 MHz to color burst ROM 112 (FIG. 1C). Terminal 160c' provides a control signal to switch controller 118 (FIG. 1C). Terminal 160d' provides a control signal to switch controller 121 (FIG. 1C). Terminal 116c' provides a 14.32 MHz clocking signal to digital-to-analog converter 124 (FIG. 1C).

The third video subsystem 17 also includes a first switch controller 161 having an input terminal 161a and having a linkage indicated by a dotted line 161b linking the poles of switches 123, 133, 143 and 153 to control the position thereof, and a second switch controller 162 having an input terminal 162a and having a linkage indicated by a dotted line 162b linking the poles of switches 126, 136, 146, 156 to control the position thereof. Terminals 161a and 162a are connected to bus 65 on which an even line signal is supplied. The controllers 161 and 162 are phased in response to the even line signal so that when the first, third, fifth and seventh switches are contacting the first contact terminals thereof, the poles of the second, fourth, sixth and eighth switches have their poles contacting the second positions of the switches thereof as shown and vice versa.

The input terminal 121a of low pass filter 121 is connected to bus 61. The output terminal 121b of low-pass filter 121 is connected to input terminal 122a of analog-to-digital converter 122. The output terminal 122b of analog digital converter 122 is connected to pole terminal 123a of switch 123. Terminal 122c is connected to terminal 160h of timing generator 160. Contact terminal 123b is connected to input terminal 124a of first shift register 124. Output terminal 124b is connected to contact terminal 126b of switch 126. Terminals 124c and 124d are connected to terminals 160p and 160q, respectively, of timing generator 160. Contact terminal 123c is connected to input terminal 125a of second shift register 125. Terminal 125b is connected to contact terminal 126c of switch 126. Terminals 125c and 125d are connected to terminals 160o and 160r, respectively, of timing generator 60. Terminal 126a of switch 126 is connected to terminal 95.

Input terminal 131a of filter 131 is connected to bus 62. The output terminal 131b of filter 131 is connected to input terminal 132a of A/D converter 132. The output terminal 132b 1 is connected to pole terminal 133 of switch 133. Terminal 132c is connected to terminal 160g of timing generator 160. Contact terminal 133b is connected to input terminal 133a of third shift register 134. Output terminal 134b is connected to contact terminal 136b. Terminals 134c and 134d are connected to terminals 160n and 160s, respectively, of timing generator 160. Contact terminal 133c is connected to input terminal 135a of fourth shift register 135. The output terminal 135b is connected to contact terminal 136c. Terminals 135c and 135d are connected to terminals 160m and 160t, respectively, of timing generator 160. The pole terminal 136a of switch 136 is connected to terminal 96.

Input terminal 141a of low-pass filter 141 is connected to bus 63. The output terminal 141 is connected to input terminal 142a of A/D converter 142. Output terminal 142b is connected to pole terminal 143a of switch 143. The terminal 142c is connected to terminal 160f of timing generator 160. Contact terminal 143b is connected to input terminal 144a of the fifth shift register 144. The output terminal 144b is connected to contact terminal 146b of switch 146. Terminals 144c and 144d are connected to terminals 160l and 160u, respectively, of timing generator 160. Contact 143c is connected to input terminal 145a of sixth shift register 145. Output terminal 145b is connected to contact 146c. Terminals 145c and 145d are connected to terminals 160k and 160v, respectively, of timing generator 160. Pole terminal 146a is connected to terminal 97.

The input terminal 151a of low-pass filter 151 is connected to bus 64. The output terminal 151b is connected to input terminal 152a of A/D converter 152. The output terminal 152b is connected to pole terminal 153a. The terminal 152c is connected to terminal 160e of timing generator 160. The contact terminal 153bb of switch 153 is connected to input terminal 154a of the seventh shift register 154. The output terminal 154b is connected to contact terminal 156b of switch 156. The terminals 154c and 154d are connected to terminals 160j and 160w, respectively, of timing generator 160. The contact terminal 153c of switch 153 is connected to input terminal 155a of the eighth shift register 155. The output terminal 155b is connected to contact 156c of switch 156. The terminals 155c and 155d are connected to terminals 160i and 160x, respectively, of timing generator 160. The pole terminal 156a is connected to terminal 98.

The operation of channels 91, 92, 93 and 94 of the third video subsystem 17 will now be described in connection with Table I. In response to an even line signal applied to controller 161, the switches 123, 133, 143 and 153 are set with the poles thereof contacting the first contact terminals 123b, 133b, 143b, 153b thereof thereby enabling information to be written into the first shift register 124, the third shift register 134, the fifth shift register 144 and the seventh shift register 154.

TABLE I

| | THIRD VIDEO SUBSYSTEM 17 OF TRANSMISSION STATION 10 | | | | | | |
|---|---|---|---|---|---|---|---|
| | | | | Shift Register | | | |
| Input Signal | Location | Band-width | Number of Samples | Input Clock Rate | Output Clock Rate | Output Clock Time | Bandwidth of Comp. Signal |
| Diff. Signal | Ch. 91 | 1.35 MHz | 221 | $6/5\ f_c$ (4.30 MHz) | $4\ f_c$ (14.32 MHz) | 15.43 μs (microseconds) | 4.5 MHz |
| 1st Color Signal | Ch. 92 | .45 MHz | 74 | $2/5\ f_c$ | $4\ f_c$ | 5.16 μs | 4.5 MHz |
| 2nd Color Signal | Ch. 93 | .45 MHz | 74 | $2/5\ f_c$ | $4\ f_c$ | 5.16 μs | 4.5 MHz |
| Sum Signal | Ch. 94 | 3.0 MHz | 495 | $8/3\ f_c$ | $4\ f_c$ | 34.57 μs | 4.5 MHz |

In response to an even line signal applied to controllr 162, the switches 126, 136, 146 and 156 are set with poles thereof contacting the second contact terminals 126c, 136c, 146c, and 156c thereof thereby enabling information which previously had been written into the second shifter 125, the fourth shift register 135, the sixth shift register 145, and the eighth shift register 155 to be read out and appear, respectively, on terminals 95, 96, 97 and 98. One line of the compound video signal appearing on bus 61 is filtered by the low-pass filter 121 and limited to a bandwidth of 1.35 MHz. The bandwidth limited signal is converted from analog to digital form by the A/D converter 122 at a 6/5 $f_c$ rate providing 221 samples. The 221 samples are clocked into the first shift register 124 at a 6/5×$f_c$ rate over a one line period and are stored therein. Similarly, over the one line period one line of the compound video signal appearing on bus 62 is filtered and bandwidth limited to 0.45 MHz by the low-pass filter 131. The bandwidth limited signal is converted into a digital signal by the A/D converter 132 at a 2/5 $f_c$ rate to provide over the one line interval 74 samples. The 74 samples are clocked into the third shift register 134 and are stored therein. Similarly, one line of the compound video signal appearing on bus 63 is filtered and limited to a bandwidth of 0.45 MHz by low-pass filter 141. The bandwidth limited signal is converted by the A/D converter 142 into a digital signal of 74 samples by clocking at a 2/5 $f_c$ rate. Over the one line period, the 74 samples are clocked into the fifth shift register 141 at a 2/5 $f_c$ rate and stored therein. Similarly, one line of the compound video signal appearing on bus 64 is filtered by low-pass filter 151 and limited to a bandwidth of 3.0 MHz. The bandwidth limited signal is converted into a digital signal at a 8/3 $f_c$ rate to provide 495 digital samples. The digital samples are clocked into the seventh shift register 154 at a 8/3 $f_c$ rate and stored therein.

During the next line of the compound video signals the controller 162 actuates the output switches 126, 136, 146 and 156 to cause the poles thereof to engage the first contact terminal 126b, 136b, 146b and 156b thereof thereby enabling the information read into the first shift register 124, the third shift register 134, the fifth shift register 144, and the seventh shift register 154 to be read out during this line time. Also, during the next line of the compound video signals the contoller 161 actuates the input switches 123, 133, 143 and 153 to cause the poles thereof to engage the second contacts 123c, 133c, 143, and 153 thereof thereby enabling information on the next lines of the compound video signals to be written into the second shift register 124, the fourth shift register 134, the sixth shift register 145, and the eighth shift register 155.

The manner in which the first shift register 124, the third shift register 134, the fifth shift register 144, and the seventh shift register 154, are read out during the succeeding time interval will be described in connection with the compound of video signal of FIG. 7. It is assumed that the readout of the first, third, fifth, and seventh shift registers occurs during the interval $t_0$-$t_{10}$ of FIG. 7. During the interval $t_2$-$t_3$ clocking signal of frequency at 4×$f_c$ is applied to clocking terminal 134d of the third shift register 134 from terminal 160s of the timing generator to clock out 74 samples of the signal stored therein through switch 136 to output terminal 96. During the time interval $t_4$ to $t_5$ a clocking signal of frequency 4x $f_c$ is applied to clocking terminal 144d of the fifth shift register 144 from terminal 160u of timing generator 160 to clock out the 74 samples of the signal stored therein through switch 146 to output terminal 97. During interval $t_6$ to $t_7$ a clocking signal of frequency 6/5×$f_c$ is applied to terminal 124d of the first shift register 124 from terminal 160q of timing generator 160 to clock out the 221 samples stored therein through switch 126 to output terminal 95. During interval $t_8$ to $t_9$ a clocking signal of frequency of 4×$f_c$ is applied to clocking terminal 154d of seventh shift register 154 from terminal 160w of timing generator 160 to clock out the 495 samples of the signal stored therein through switch 156 to output terminal 98. While the foregoing readout operation is occurring the next line of the signals of lines 61, 62, 63 and 64 are filtered, converted into digital samples and stored in the second shift register 125, the fourth shift register 135, the sixth shift register 145 and the eighth shift register 155 respectively in the same manner as the prior lines of composite signals.

In response to the even line signal the controller 161 causes the switchs 123, 133, 143 and 153 to be changed in position to enable the next line of information to be written into the first, third, fifth and seventh shift registers. Also, in response to an even line signal the controller 162 causes switches 126, 136, 146 and 156 to be changed in position to enable the signals stored in the second, fourth, sixth and eighth shift registers to be read out. The readout of the shift registers occurs during the time interval shown as $t_{10}$ to $t_{20}$ of FIG. 7. During time interval $t_{12}$ to $t_{13}$ the 74 samples stored in the fourth shift register 135 are clocked out in response to a 4×$f_c$ signal applied to control terminal 135d from terminal 160t of timing generator 160 and appear at terminal 96. During the time interval $t_{14}$ to $t_{15}$ the 74 samples stored in the sixth shift register 145 are clocked out by the application by a clocking signal of frequency 4×$f_c$ from terminal 160v of timing generator 160 and appear at terminal 97. During the time interval $t_{16}$ to $t_{17}$ the 221 samples of signal stored in the second shift register 125 are clocked out by the application of a clocking signal of frequency 4×$f_c$ to clocking terminal 125d from terminal 160r of timing generator 160 and appear at terminal 95. During time $t_{18}$ to $t_{19}$ the 495 samples stored in the eighth shift register 155 are clocked out by the application to terminal 155d of a frequency 4×$f_c$ from clocking terminal 160x of timing generator 160 and appear at terminal 98. The two line cycle described for the two lines of the compound video signal of FIG. 6 continues for succeeding pairs of lines.

Referring now particularly to FIG. 1C, the third video subsystem 17 also includes a read only memory (ROM) 110 having an input terminal 110a and an output terminal 110b. Gray level code in digital form is stored in the ROM 110. In digital format, black level is indicated by the eight bit word 00000000, white level is indicated by the eight bit word 11111111. Gray level code is indicated by the eight bit binary word 10000000. In response to a clocking signal of frequency 4×$f_c$ applied to the input terminal 110a over the period of time $t_0$ to $t_1$ samples of the gray level in binary code are delivered at output terminal 110b. The clocking signal applied to 110b is obtained from terminal 160a' of timing generator 160.

The apparatus also includes a color burst ROM 112 having an input terminal 112a and an output terminal 112b. In response to 4×$f_c$ clocking signal applied to terminal 112a from terminal 160b' of timing generator 160 during the time interval $t_{10}$ to $t_{11}$ samples in digital format representing several cycles of a 3.58 MHz color burst signal at gray level is provided at output terminal 112b.

The third video subsystem 17 also includes an interpolator 114 having input terminals 114a, 114b, 114c, 114d, 114e and 114f, an output terminal 114g and a control terminal 114h. The interpolator unit 114 develops signal component 76 of FIG. 7 at its output terminal 114g during the time $t_1$ to $t_2$ in response to the occurrence of the last sample on terminal 110b and the first sample on terminal 96. Component 77 is developed at output terminal 114g during the time interval $t_3$ to $t_4$ from the last sample on terminal 96 and the first sample on terminal 97. Signal component 78 is developed at output terminal 114g during time interval $t_5$ to $t_6$ from the last sample available on terminal 96 and the first sample available on terminal 95. Component 79 is developed at output terminal 114g during time $t_7$ to $t_8$ from the last sample available on terminal 95 and the first sample available on terminal 98. The signal component 80 is developed at output terminal 114g during the time interval $t_9$ to $t_{10}$ from the last sample available on terminal 98 and the first sample available on terminal 110b. As mentioned above the interpolated components are generated by sensing the terminal signal of one signal component and the initial sample of the next signal component and generating interpolated values which constitute a smooth transition from the termination of one signal component to the initation of the succeeding signal component.

The interpolator 114 includes a multiplexer in the form of a pair of rotary switches 116 and 117. Rotary switch 116 includes a pole terminal 116a and contact terminals 116b, 116c, 116d, 116e and 116f. The rotary switch 117 includes a pole terminal 117a and contact terminals 117b, 117c, 117d, 117e and 117f. Contact terminal 116b is connected to terminal 114a which in turn is connected to terminal 110b of gray level ROM 110. Terminals 116c and 116d are connected to terminal 114d which in turn is connected to terminal 97. Terminals 116e and 116f are connected to terminal 114c which in turn is connected to terminal 98. Terminal 117b and 117c are connected to terminal 114d which in turn is connected to terminal 96. Terminals 117d and 117e are connected to terminal 114e which in turn is connected to terminal 95. Terminal 117f is connected to terminal 114f which in turn is connected to terminal 110a of gray level ROM 110. A controller 118 having an input terminal 118a and a mechanical linkage 119b is provided. The poles of switches 116 and 117 are ganged and connected to linkage 118b of the controller 118. The controller 118 is controlled by a signal obtained from terminal 160c' of timing generator 160. In response to this timing signal from terminal 117c' the poles of the switches 116 and 117 are caused to engage the contacts thereof in proper sequence and to dwell thereon for the appropriate period of time to provide at the poles 116a and 117a a pair of pulses, one representing the terminal sample of one component and the other representing the initial sample of a succeeding signal component.

The interpolator unit 114 also includes an arithmetic logic unit 119 having input terminals 118a, 119b and an output terminal 119c. Input terminal 119a is connected to pole terminal 116a and input terminal 119b is connected to pole 117a. Output 119c connected to output terminal 114g. The arithmetic logic unit 119 develops three samples for each of the interpolated signal components of signal. Samples are developed in accordance with the following equations:

$$t = x - \frac{x-y}{4} \quad (1)$$

$$u = x - \frac{2(x-y)}{4} \quad (2)$$

$$v = x - \frac{3(x-y)}{4}, \quad (3)$$

where
x is the terminal sample of one signal component,
y is the initial sample of the succeeding signal component,
t represents the first sample in the interpolated component,
u represents the second sample in the interpolated component,
v represents the third sample in the interpolated component.

Thus, a sequence of three pulses or samples are generated for each of the signal components 76, 77, 78, 79 and 80 of FIG. 7 in real time and supplied to the output terminal 114g of the interpolator unit.

The third video subsystem 17 also includes a multiplexing unit in the form of a rotary switch 120 having a pole terminal 120a and contact terminals 120b, 120c, 120d, 120e, 120f, 120g and 120h, each contact consisting of eight lines. Terminals 114g, 95, 96, 97, 98, 110b and 112b are connected to terminals 120b, 120c, 120d, 120e, 120f, 120g and 120h, respectively. The third video subsystem 17 also includes a controller 121 for the switch 120 including an input terminal 121a and a linkage indicated by dotted line 121b controlling the position of the pole of the rotary switch 120. In response to a control signal from terminal 160d' of timing generator 160 applied to control terminal 121a of the controller 121, the control arm or pole of the switch 120 is moved into engagement with each of the contacts thereof and dwells thereon the appropriate time to assemble the components of the signal shown in FIG. 7 in proper sequence. The resultant digital signal appears at the pole terminal 120a.

The third video subsystem 17 also includes a digital-to-analog converter 124 having an input terminal 124a, an output terminal 124b and a control terminal 124c, and also includes a low-pass filter 125 having an input terminal 125a and an output terminal 125b. The input terminal of digital-to-analog converter 124 is connected to the pole terminal 120a. The output terminal 124b of the digital-to-analog converter 124 is connected to the input terminal 125a of the filter 125. The output terminal 125b of the filter is connected to the output terminal 100. The clocking terminal 124c is connected to terminal 160e' of timing generator 160 which supplies a clocking signal of frequency $4 \times f_c$ continuously to convert the digital signal applied to its input terminal into an analog signal at its output terminal. The low-pass filter 125 limits the frequency components of the signal at the output of the digital-to-analog converter to a bandwidth of 4.75 MHz.

The transmitting station 10 also includes a frame sync generator 130, a switch 131, and a controller 132 for the switch 131. The frame sync generator has input terminals 130a, 130b, 130c and an output terminal 130d. The switch 131 has a pole terminal 131a, a first contact terminal 131b and a second contact terminal 131c. The controller 132 has an input terminal 132a and a control linkage indicated by dotted line 132b connected to the pole of switch 131 to control the position thereof. The input terminal 131a of frame sync generator 130 is connected to bus 67 on which 14.32 MHz clocking signal is obtained. Input terminal 130b is connected to bus 68 on which horizontal drive signal is obtained. Input terminal 130c is connected to bus 66 on which line 265 signal is obtained. The output terminal 130d is connected to contact terminal 131c of switch 131. Contact terminal 131b is connected to terminal 100 at which a compound video signal from the third video subsystem 17 is obtained. The input terminal 132a of switch controller 132 is connected to bus 66 on which line 265 signal is obtained.

In response to the 14.32 MHz clocking signal, the horizontal drive signal, and the line 265 signal applied to terminals 130a, 130b and 130c, respectively, the frame sync generator 130 develops at output terminal 130d thereof a signal during the occurrence of line 265 of the first video signal from source 20 for signal processing at the receiving station 150 of FIGS. 2A–2C to be described below. The frame sync generator 130 will be described in greater detail below in connection with FIGS. 9, 11A–11G.

The pole of switch 131 is actuated by controller 132 over linkage 132b to maintain the pole thereof contacting terminal 131b during all 525 lines of a frame except line 265. In response to a signal on bus 66 during line 265 the pole of switch 132 is moved to contact terminal 131c to which is applied the frame synchronization signal from frame sync generator 130. Thus, during line 265 of each frame, a frame synchronization signal appears. The combined signal appears at the pole terminal 131a of the switch 131. The synchronization signal on line 265 is utilized to synchronize the frames at the receiving station for decoding the first and second video signals from the compound video signal transmitted thereto, as will be described below.

The carrier subsystem 18 of the transmitting station 10 includes a carrier generator 135, a modulator 136, a vestigial sideband filter 137, and an amplifier 138. The carrier generated by carrier generator 135 is applied to one input terminal of the modulator 136 to the other input terminal of which is applied to the composite video signal obtained from the pole terminal of switch 131. Thus, at the output of the modulator 136 is obtained a carrier wave modulated in amplitude by the composite video signal. After filtering the signal obtained at the output of the modulator by the vestigial sideband filter 137, the response of which is shown in FIG. 6E, the modulated carrier wave is amplified by amplifier 138 and thereafter applied to a suitable transmission channel, such as a transmission line or televison channel, for reception at a receiving station.

Figure 2B:
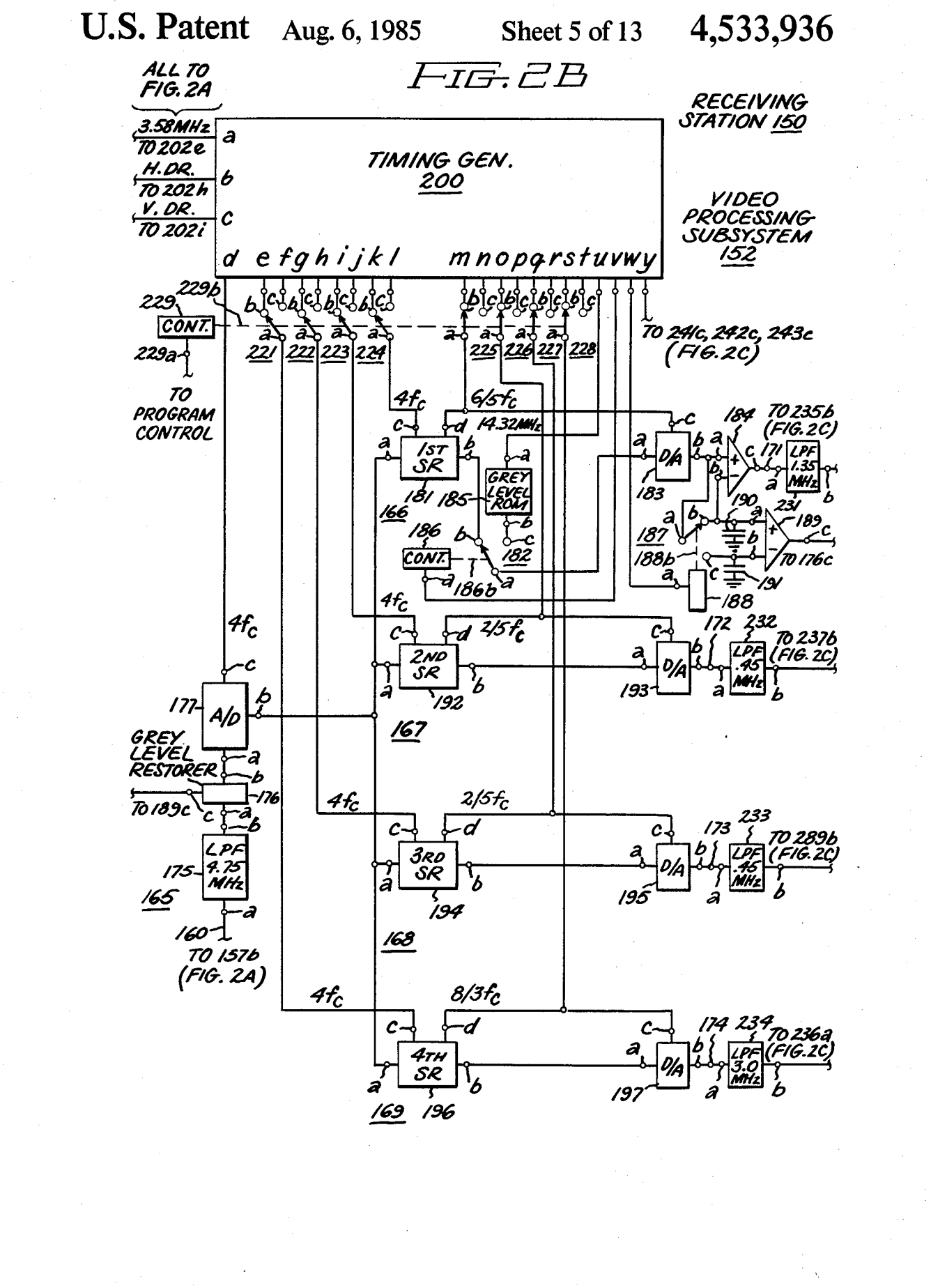

Referring to FIGS. 2A, 2B and 2C, the receiving station 150 includes a tuner subsystem 151, a video processing subsystem 152, a burst synchronization subsystem 153, a frame synchronization subsystem 154 and a video signal reconstitution subsystem 155.

The tuner subsystem comprises an RF tuner 156 having an input terminal 156a and an output terminal 156b, and an IF converter and video detector 157 having an input terminal 157a and an output terminals 157b and 157c. The input terminal 156a of the tuner 156 is coupled to the transmission channel. At the output terminal 156b is obtained a carrier wave modulated by the compound video signal which is applied to the input terminal 157a of the IF converter and video detector 157.

The compound video signal is obtained at output terminal 157b of IF converter and video detector 157.

The function of the video processing subsystem 152 of FIG. 2B is to convert one of the two lines of the compound video signal appearing at output terminal 157a into separate luminance, and first and second color signals at terminals 161, 162 and 163, respectively (FIG. 2C). The video processing subsystem 152 includes an input channel 165 and four processing channels 166, 167, 168 and 169. Channel 166 selects the fourth component of a line of the compound video signal of FIG. 7, for example, signal component 74, expands the duration thereof to the duration of a line and provides such signal at output terminal 171. Channel 166 also provides a circuit means for sensing gray level of the fourth component of signal, comparing that level with gray level of reference value and provide an output utilized to maintain gray level of the compound video signal in the input channel 165 to assure appropriate processing of the various components of the video signal. Channel 167 processes the second component 72 of a line of the compound video signal of FIG. 7 into a signal expanded to a duration of a full line and provides such signal at output terminal 172. Channel 168 processes the third component 73 of a line of the compound signal of FIG. 7 into a signal expanded to a duration of a full line and provides such signal at output terminal 173. Channel 169 processes the fifth component 75 of a line of the compound video signal of FIG. 7 into a signal expanded to a duration of a full line and provides such signal at output terminal 174.

Channel 165 comprises a low-pass filter 175, a gray level restorer 176, and an analog-to-digital converter 177. The low-pass filter 175 having a cutoff frequency of 4.75 MHz has an input terminal 175a and an output terminal 175b. The gray level restorer 176 has an input terminal 176a, an output terminal 176b and a control terminal 176c. The analog-to-digital converter 177 has an input terminal 177a, an output terminal 177b, and a control terminal 177c. The analog-to-digital converter 177 converts the analog signal at its input terminal 177a into a digital signal at its output terminal 177b. Each line of the signal appearing at the input terminal 177b is converted into 910 samples. Each sample or value has a resolution of 256 levels represented by 8 bits.

The channel 166 comprises a first shift register 181, a switch 182, a digital-to-analog converter 183, a differential amplifier 184, a ROM (read only memory) 185 in which gray level code is stored, a controller 186, a switch 187, a controller 188 for switch 187, and a differential amplifier 189. The channel 167 includes a second shift register 192 and a digital-to-analog converter 193. The channel 168 includes a third shift register 174 and a digital-to-analog converter 195. The channel 169 includes a fourth shift register 196 and a digital-to-analog converter 197.

The first shift register 181 has 8 channels and has an input terminal 181a consisting of eight lines, each line being connected to an input of a respective channel, an output terminal 166b consisting of eight output lines, each line connected to the output of the respective channel, a control or clocking terminal 181c consisting of eight lines, each line connected to a respective channel for clocking the channels of the shift register at a rate of $4 \times f_c$ during a particular line time and a control or clocking terminal 181d consisting of eight lines each line connected to a respective channel for clocking the channels at another rate of $6/5 \times 3.58$ MHz. The switch 182 has a pole terminal 182a consisting of eight lines, a first contact terminal 182b consisting of eight lines, a second contact terminal 182c consisting of eight lines. The digital-to-analog converter 183 has an input terminal 183a, an output terminal 183b and a control terminal 183c. Digital-to-analog converter 183 converts the digital signal at its input terminal 183a into an analog signal at its output terminal 183b. The differential amplifier 184 includes a noninverting input terminal 184a, an inverting input terminal 184b, and an output terminal 184c. The ROM 185 includes an input terminal 185a and an output terminal 185b. Controller 186 has a control terminal 186a and a linkage 186b connected to the pole of the switch 184 for controlling the position thereof in response to the control signal applied at the input terminal 186a. The switch 187 has a pole terminal, a first contact terminal 187b and a second contact terminal 187c. Controller 188 has an input terminal 188a and a linkage indicated by a dotted line 188b connected to the pole of switch 187 for controlling the position thereof in response to a control signal at terminal 188a. The differential amplifier 189 includes a noninverting input terminal 189a, an inverting input terminal 189b and an output terminal 189c.

The second shift register 192 has eight channels and has an input terminal 192a consisting of eight lines, each line being connected to the input of a respective channel, an output terminal 192b consisting of eight output lines, each line connected to the output of a respective channel, a control or clocking terminal 192c consisting of eight lines, each line connected to a respective channel for clocking the channels of the shift register at the rate of $4 \times 3.58$ MHz during a particular line time, and a control or a clocking terminal 192d consisting of eight lines, each line connected to a respective channel for clocking the channels at another rate of $2/5 \times 3.58$ MHz. The digital-to-analog converter 193 has an input terminal 193a, an output terminal 193b and a control terminal 193c.

The third shift register 194 has eight channels and has an input terminal 194a consisting of eight lines, each line being connected to the input of a respective channel, an output terminal 194b consisting of eight output lines, each line connected to the output of a respective channel, a control or clocking terminal 194c consisting of eight lines, each line connected to a respective channel for clocking the channels of the shift register at the rate of $4 \times 3.58$ MHz during a particular line time and a control or clocking terminal 194b consisting of eight lines, each line connected to a respective channel for clocking the channels at another rate of $2/5 \times 3.58$ MHz. The digital-to-analog converter 195 has an input terminal 195a, an output terminal 195b and a control terminal 195c.

The fourth shift register 196 has eight channels and has an input terminal 196a consisting of eight lines, each line connected to the input of a respective channel, an output terminal 196b consisting of eight output lines, each line connected to the output of a respective channel, a control or clocking terminal 196c consisting of eight lines, each line connected to a respective channel for clocking the channels of the shift register at one rate of $4 \times 3.58$ MHz during a particular line time and a control or clocking terminal 196b consisting of eight lines, each line connected to a respective channel for clocking the channels at another rate of $8/3 \times 3.58$ MHz. The digital-to-analog converter 197 has an input terminal 197a, an output terminal 197b and a control terminal 197c.

The video processing subsystem 152 also includes a timing generator 100 having input terminals 200a, 200b and 200c and output terminals 200d–200y. Input terminal 200a is connected to terminal 202e (FIG. 2A) which provides a 3.58 MHz signal. Input terminal 200b is connected to terminal 202h (FIG. 2A) which provides horizontal drive. Input terminal 200c is connected to terminal 202i (FIG. 2A) which provides vertical drive. Terminal 200d provides a continuous clocking signal of $4 \times f_c$ MHz. Terminals 200e, 200g, 200i, and 200k provide a signal of $4 \times f_c$ MHz during one set of alternate line intervals. Output terminals 200f, 200h, 200j and 200k provide a clocking signal of frequency $4 \times f_c$ during alternate line intervals. Output terminals 200m, 200o, 200q and 200s provide clocking signals of 6/5 $f_c$, 2/5 $f_c$, 2/5 $f_c$ and 8/3 $f_c$, respectively, during one set of alternate line intervals. Output terminals 200n, 200p, 200r and 200t provide clocking signals of frequencies 6/5 $f_c$, 2/5 $f_c$, 2/5 $f_c$, and 8/3 $f_c$, respectively, during an alternate set of line intervals. Terminal 200u provides a timed 14.32 l MHz signal for gray level ROM 185. Terminals 200v and 200w provide control signals for controllers 186 and 188, respectively, as will be described below. Terminal 200y provides a 14.32 MHz clocking signal to clocked delay lines 241, 242, and 243 of FIG. 2C.

Line selector switches 221–228 are provided for selecting one of the two sets of clocking signals on terminals 200e–200t depending upon which set of alternate lines of the compound video signal of FIG. 6 are to be decoded. Switch 221 has a pole terminal 221a, a first contact terminal 221b connected to terminal 200e and a second contact terminal 221c connected to terminal 200f. Switch 222 has a pole terminal 222a, a first contact terminal 222b connected to terminal 200g and a second contact terminal 222c connected to terminal 200h. Switch 223 has a pole terminal 223a, a first contact terminal 223b connected to terminal 200i and a second contact terminal 223c connected to terminal 200j. Switch 224 has a pole terminal 224a, a first contact terminal 224b connected to terminal 200k and a second contact terminal 224c connected to terminal 200l. Switch 225 has a pole terminal 225a, a first contact terminal 225b connected to terminal 200m and a second contact terminal 225c connected to terminal 200n. Switch 226 has a pole terminal 226a, a first contact terminal 226b connected to terminal 200o and a second contact terminal 226c connected to terminal 200p. Switch 227 has a pole terminal 227a, a first contact terminal 227b connected to terminal 200q and a second contact termial 227c connected to terminal 200r. Switch 228 has a pole terminal 228a, a first contact terminal 228b connected to terminal 200s and a second contact terminal 228c connected to terminal 200t. A controller 229 having an input terminal 229a and a control linkage indicated by dotted line 229b linked to the poles of switches 221–228 to control the position thereof is provided. In response to a control signal applied to input 229a, the controller 229 sets the position of the poles of switches 221–228 into one position making contact with the first contact terminals thereof or the other position thereof making contact with the second contact terminals thereof.

The input terminal 175a of a filter 175 is connected to output terminal 157b of IF converter and video detector 157. The output terminal 175b is connected to input terminal 176a of gray level restorer 176. The output terminal 176b is connected to input terminal 177 of analog-to-digital converter 177. The control terminal 176c of gray level restorer 176 is connected to terminal 189c of differential amplifier 189. The control terminal 177c is connected to terminal 200d of timing generator 200. Terminal 181a of first shift register 181, terminal 192a of the second shift register 192, terminal 194a of the third shift register 194 and terminal 196a of the fourth shift register 196 are connected to the output terminal 177b of the analog-to-digital converter 177. The output terminal 181b is connected to the first contact terminal 182b of switch 182. Terminal 181c is connected to terminal 224a. Terminal 181d is connected to terminal 225a. Terminal 182c is connected to output terminal 185b of gray level code ROM 185. The input terminal 185a is connected to terminal 200u of timing generator 200. Pole terminal 182a is connected to the input terminal 183a of digital-to-analog converter 183. The control terminal 183c is connected to pole terminal 225a of switch 225. Output terminal 183b is connected to input terminal 184a of differential amplifier 184 and to the pole terminal 187a of switch 187. Output terminal 184c of differential amplifier is connected to terminal 171. Contact terminal 187b is connected to the inverting terminal 184b of differential amplifier 184 and to the noniverting terminal 189a of differential amplifier 189. The contact 187c is connected to the inverting terminal of amplifier 189. The output terminal of amplifier 189 is connected to control terminal 176c of gray level restorer 176. A capacitor 190 is connected between the noninverting terminal 189a and ground. Another capacitor 191 is connected between the inverting terminal 189b and ground. The input terminal of the controller 188 is connected to terminal 200w of timing generator 200. The input terminal 186a of controller 186 is connected to terminal 200v.

The output terminal 192b of shift register 192 is connected to the input terminal 193a of digital-to-analog converter 193. Control terminal 192c is connected to pole terminal 223a of switch 223. Control terminal 192d is connected to pole terminal 226a of switch 226. Control terminal 193c of digital-to-analog converter 193 is connected to pole terminal 226a. The output terminal 193b of digital-to-analog conveter 193 is connected to output terminal 172. Output terminal 194b of shift register 194 is connected to input terminal 195a of digital-to-analog converter 195. Control terminal 194c is connected to pole terminal 222a of switch 222. Control terminal 194d is connected to pole terminal 227a of switch 227. Control terminal 195c of digital-to-analog converter 195 is connected to pole terminal 227a. The output terminal 195b is connected to terminal 173. The output terminal 196g of shift register 196 is connected to the input terminal 197a of digital-to-analog converter 197. The control terminal 196c is connected to pole terminal 221a of switch 221. The control terminal 196d is connected to pole terminal 228a of switch 228. Output terminal 197b is connected to terminal 174.

The operation of channels 166, 167, 168 and 169 of the video processing subsystem 152 will now be described in connection with Table II. In response to a video signal or program selection signal applied to controller 229, the switches 221-228 are set with poles contacting the first contact terminals thereof enabling appropriately timed clocking signals of $4 \times f_c$ frequency to be applied to the first, second, third and fourth shift registers to clock in the fourth, second, third, and fifth components, respectively, of the compound video signal of FIG. 7, in digital format over selected intervals of time of a line period. Also clocking signals of frequencies $6/5\ f_c$, $2/5\ f_c$, $2/5\ f_c$ and $8/3\ f_c$ are applied to the first, second, third and fourth shift registers, respectively, to clock out each of the fourth, second, third and fifth components, respectively, of the compound video signal of FIG. 7 over a successive line period. It is assumed that the fourth, second, third and fifth components of the first line of the video signal of FIG. 7 have been clocked into the first, second, third and fourth shift registers and accordingly at the output terminals thereof during a succeeding line time the fourth, second, third and fifth signals have been expanded so that each extends over a full line time.

TABLE II

VIDEO PROCESSING SUBSYSTEM 152 OF RECEIVING STATION

| Input Signal | Location | Number of Samples | Shift Register Input Clock Rate | Input Clock Time | Output Clock Rate | Bandwidth of Output Signals |
|---|---|---|---|---|---|---|
| Diff. Signal | Ch. 166 | 221 | $4\ f_c$ | 15.43 μs (microseconds) | $6/5\ f_c$ | 1.35 MHz |
| 1st Color Signal | Ch. 167 | 74 | $4\ f/c$ | 5.16 μs | $2/5\ f_c$ | .45 MHz |
| 2nd Color Signal | Ch. 168 | 74 | $4\ f_c$ | 5.16 μs | $2/5\ f_c$ | .45 MHz |
| Sum Signal | Ch. 169 | 495 | $4\ f_c$ | 34.57 μs | $8/3\ f_c$ | 3.0 MHz |

Over an initial portion of the successive line time the pole 182a of switch 182 makes contact with terminal 182c thereby providing at pole terminal 182a a digital code corresponding to gray level. The 14.32 MHz clocking signal is appropriately positioned in time to obtain this result. The digital code would be 10000000 and thereafter the pole terminal 182a is moved to contact terminal 182b thereby providing at pole terminal 182a the digital signal having an inserted gray level reference at the beginning of the line followed by a full line of the fourth component of the signal of the first line of FIG. 7. The switch 182 is controlled by a timing signal provided to contact 186a of controller 186 from timing terminal 200v of timing generator 200. The signal at the pole terminal 182a is converted into an analog signal appearing at the output of the digital-to-analog converter 183. Initially, the gray level signal is sensed and its level stored at contact terminal 187c of switch 187. The pole of switch 187 is moved in response to a control signal applied to terminal 188a of controller 188 from the terminal 200w of timing generator 200 to cause the pole of switch 187 to engage contact 187b thereof after sensing of the gray level reference signal thereby enabling the average level of the signal to be sensed across capacitor 190 and at the noninverting terminal 189a of differential amplifier 189. A departure in the average of the signal from the gray level locally generated at ROM 185 is sensed by the differential amplifier 189 which develops an error signal to adjust the offset voltage of the gray level restorer circuit 176 to provide an offset voltage therein with respect to the analog-to-digital converter 177 equal to that employed at the corresponding analog-to-digital circuits 132, 142, 152 at the transmission station. The gray level signal at pole terminal 187b is applied to the inverting terminal 184b of the differential amplifier 184 to remove the average or DC component of the signal appearing on the noninverting terminal 184a and thus recovers the AC component of the fourth component of the compound video signal of FIG. 7.

The second component of the compound video signal of FIG. 7 is clocked into the second shift register 192 during a time corresponding to the time $t_2$ to $t_3$ in response to the control signal applied to the input clocking terminal 192c from terminal 123a of switch 123. During the succeeding line interval the second component is clocked out of the second shift register over a line time in response to the clocking signal applied to the clocking terminal 192d. The second component is expanded to an interval of a full line and is converted by digital-to-analog converter 193 into an analog signal at terminal 172. Similarly, the third component of the compound video signal of FIG. 7 is clocked into the third shift register during a time interval corresponding to the time $t_4$ to $t_5$, is clocked out over a succeeding line interval. The third component is converted by the digital-to-analog converter 195 into an analog signal extending over a line time and appears at terminal 173. Similarly, the fifth component of the compound video signal of FIG. 7 is clocked into the fourth shift register during a time interval corresponding to the time $t_8$ to $t_9$. The fifth component is converted by the digital-to-analog converter 197 into an analog signal extending over a line time and appears at terminal 174.

The video processing subsystem 152 also includes a low pass filter 231 for passing frequencies up to 1.35 MHz, a low pass filter 232 for passing frequencies up to 0.45 MHz, a low pass filter 233 for passing frequencies up to 0.45 MHz and a filter 234 for passing frequencies up to 3.0 MHz. a summation amplifier 235, a differential amplifier 236, switches 237, 238, 239, a controller 240 for switches 237, 238 and 239 and delay lines 241, 242 and 243.

Low pass filter 231 has an input terminal 231a and an output terminal 231b. The low pass filter 232 has an input terminal 232a and an output terminal 232b. The low pass filter 233 has an input terminal 233a and an output terminal 233b. The low pass filter 234 has an input terminal 234a and an output terminal 234b. The summation amplifier 235 has input terminals 235a and 235b and an output terminal 235c. The differential amplifier 236 has a noninverting input terminal 236a, an inverting input terminal 236b and an output terminal 236c. The switch 237 has a pole terminal 237a, a first contact terminal 237b and a second contact terminal 237c. The switch 238 has a pole terminal 238a, a first contact terminal 238b and a second contact terminal 238c. The switch 239 has a pole terminal 239a, a first contact terminal 239b and a second contct 239c. The controller 248a has an input terminal 240a and a linkage indicated by dotted line 240b linking the poles of switches 237, 238 and 239 to control the position thereof from one position in which the poles contact the first contact terminals of the switches to another position in which the poles of the switches contact the second contact terminals. The delay line 241 has an input terminal 241a, an output terminal 241b and a clocking terminal 241c. The delay line 242 has an input terminal 242a, an output terminal 242b and a clocking terminal 242c. The delay line 243 has an input terminal 243a, an output terminal 243b and a clocking terminal 243c.

Terminal 231a of filter 231 is connected to terminal 171. Terminal 231b is connected to terminal 235b. Terminal 232a is connected to terminal 172. Terminal 232b is connected to terminal 237b. Terminal 233a is connected to terminal 173. Terminal 233b is connected to terminal 238b. Terminal 234a is connected to terminal 174. Terminal 234b is connected to terminal 236a. Terminal 237a is connected to terminal 162. Terminal 237b is connected to terminal 241a of delay line 241. Terminal 237c is connected to terminal 241b. Terminal 238a is connected to terminal 163. Terminal 238b is connected to terminal 242a. Terminal 242b is connected to terminal 238c. Terminal 239a is connected to terminal 161. Terminal 239b is connected to terminal 235c. Terminal 239c is connected to terminal 243b. Terminal 235b is connected to terminal 236b. Terminal 236a is connected to terminal 235a. Terminal 236c is connected to terminal 243a. Clocking terminals 241c, 242c, and 243c are connected to terminal 200y of timing generator 200. Control terminal 240a of controller 240 is connected to terminal 208a of FIG. 2A.

At terminal 231b a signal is obtained which is the difference of two lines of luminance component of the selected video signal followed by a line period of no signal, followed by a line signal consisting of the difference of the next two lines of the luminance component, etc. Similarly, at terminal 234b, a signal is obtained consisting of the sum of two lines of the luminance component of the selected video signal followed by a line period of no signal, followed by a line period consisting of the sum of the next two lines of the luminance component, etc. At terminal 232b a signal is obtained which is the sum of two lines of the first color signal of the selected video signal followed by a line period of no signal, followed by the sum of the next two lines of the first color signal, etc. Simlarly, at output terminal 233b a signal is obtained which is the sum of two lines of the second color signal of the selected video signal, followed by a line period of no signal, followed by the sum of the next two lines of the second color signal, etc. The difference signal $l_1 - l_2$ and the sum signal $l_1 + l_2$ are summed in a summation amplifier 235 to provide at contact terminal 239b of switch 239 signal $l_1$. The difference signal $l_1 - l_2$ and the sum signal $l_1 + l_2$ are also applied to the differential amplifier 236 which provides at its output terminal the signal $l_2$. The signal $l_2$ is delayed by the delay line 243 and appears on contact terminal 239c of switch 239. The first color signal is applied to terminal 237b of switch 237 and the same signal is applied through delay line 241 to terminal 237c delayed by one line. The second color signal is applied to terminal 238d of switch 238 and the same signal is delayed by one line by delay line 242 and applied to contact 238c of switch 238. The poles of the switches 237, 238 and 239 are caused to switch from the first contact terminals to the second contact terminals thereof at the line rate. Accordingly, at the pole terminals 237a, 238a and 239a are obtained successive lines of the first color signal, the second color signal and the luminance signal, respectively. These signals appear also at terminals 162, 163 and 161, respectively. The movement of switches 237, 238 and 239 is controlled by a control signal applied to controller 240 from flip-flop circuit 207 of FIG. 2A. Selector switch 208 selects which of the oppositely phased signals of terminals 207d and 207c are utilized for controlling the controller 240 so as to recover the lines of the luminance and first and second color signals.

The frame synchronization subsystem 154 includes synchronization line detector 201 and synchronization signal generator 202. The sync line detector 101 has an input terminal 201a and an output terminal 101b. Input terminal 101a is connected to video terminal 157b of IF converter and video deteector 157. The sync line detector 201 detects the line of a frame which is encoded with the frame sync signal and provides an output at terminal 201b. The sync line detector 201 will be described below in greater detail in connection with FIGS. 10 and 11E–11G.

The sync signal generator 202 includes a vertical synchronization input terminal 202a and a horizontal synchronization input 202b which are connected to output terminal 201b of sync line detector 101, and input terminals 202c and 202d to which zero degree and 180 degree reference 14.32 MHz signal from local oscillator 206 are applied, respectively. The sync signal generator 202 also includes output terminals 202e, 202f, 202g, 202h and 202i. A 3.58 MHz signal of color burst signal of reference phase is obtained at terminal 202e. A burst flag signal is obtained at terminal 202f for gating phase locked loop 205 of burst synchronization subystem 153. A composite sync signal comprising horizontal synchronization pulses and vertical synchronization signal pulses is obtained at terminal 202g. Horizontal drive pulses are obtained at terminal 202h. Vertical drive pulses are obtained at terminal 102i. The sync signal generator 202 is a standard component and is commercially available as Integrated Circuit No. 3262B TV Sync Generator from Fairchild, a Schlumberger Company, of Mountain View, Calif.

The burst synchronization subsystem 153 includes a bandpass filter 204 having an input terminal 204a and an output terminal 204b for filtering frequencies in the pass band of 3 MHz to 4.2 MHz to recover the 3.58 color burst signals encoded on alternate lines of the compound video signal of FIG. 7. The burst synchronization subsystem 153 also includes a phase locked loop circuit 205, an AND gate 215 and an AND gate 216, a crystal controlled, voltage controlled oscillator 206 and a flip-flop circuit 207. The 3.58 MHz phase locked loop 205 includes input terminals 205a and 205b and an output terminal 205c. The AND gate 215 includes input terminals 215a, 215b and 215c and output terminal 215d. The AND gate 216 includes input terminals 216a, 216b, and 216c, and output terminal 216d. Input terminal 215a of AND gate 215 is connected to output terminal 204b of filter 104. Input terminal 216a of AND gate is connected to terminal 202e of synchronizing signal generator 202 at which a signal of a frequency of 3.58 MHz appears. The output terminal 215d is connected to input terminal 205a of phase locked loop 205. The output terminal 216d is connected to input terminal 205b of phase locked loop 205. The crystal controlled, voltage controlled oscillator 206 has an input terminal 206a which is connected to the output terminal 205c of the phase locked loop 205 and output terminals 206b and 206c at which 14.3 MHz signals of zero reference phase and 180 degree, respectively, appear. Terminal 206b is connected to terminal 202c and terminal 206c is connected to terminal 202d of synchronizing signal generator 202. The flip-flop circuit 107 includes an input terminal 207a, an input terminal 207b and output terminals 207c and 207d. Input terminal 207a is connected to output terminal 201b of sync line detector 201. Input terminal 207b is connected to output terminal 202h of sync generator 202 at which horizontal drive pulses appear. In response to frame synchronization signal applied to terminal 207a and to horizontal drive signal from synchronizing signal generator 202, flip-flop 207 develops at output terminal 207a a signal shifting from a high level at even line intervals to a low level at odd line intervals at the line frequency rate. A first set of high levels occur during a first set of alternate lines and a second set of low levels occur during a second set of alternate lines. At output terminal 207d a signal is developed identical to the signal at 207c except shifted in phase by one line period. A video selector switch 208 having a pole terminal 208a, a first contact terminal 208b and a second contact terminal 208c is provided. First contact terminal 108b is connected to terminal 207c, and second contact terminal 208c is connected to terminal 207d of the flip-flop circuit 107. A switch controller 209 is provided having an input terminal 209a and a linkage 209b connected to the pole of the switch 208 for controlling the position thereof to make contact with either the first contact terminal 208b or the second contact 208c in response to an appropriate control signal applied to the input terminal 209a. Thus, when switch 208 has its pole in a first position with the pole contacting first contact terminal 208b one set of signals alternating between a high and a low level at a line rate appears at pole terminal 208a. When the pole of switch 208 is in the second position, a second signal alternating between a high and a low level at line rate but shifted in phase by the period of one line is obtained. Accordingly, in one position the high levels are in synchronism with one set of alternate lines of the detected video signal and in the other position the high levels of the signal are in synchronization with the other set of alternate lines of the detected video signal appearing at the output of the filter 204. The pole terminal 208a of switch 208 is connected to the switch controller 240 which shifts the pole of switch 240 of FIG. 2C from one position to the other position at the line rate thereby interleaving the two sets of alternate lines of the components of the desired video which are recovered at terminals 161, 162 and 163 (FIG. 2C).

Terminal 207d is connected to terminals 215b and 216b of AND gates 115 and 116. Terminal 202f of sync signal generator 102 providing a burst flat signal is connected to input terminals 215c and 216c of AND gates 115 and 116. Thus, a set of 3.58 MHz reference or bursts is gated from alternate lines of the detected video signal into the input terminal 205a of the phased blocked loop 205. At the same time a 3.58 MHz signal from sync signal generator 202 is gated into input terminal 205b of the phase locked loop 205. The phase locked loop 205 thus is gated during the 3.58 MHz burst interval. During this interval the phase locked loop 205 compares the phase of the signal from the synchronization signal generator 202 applied to terminal 205b with the signal from filter 204 applied to terminal 205a and develops an output of one polarity at output terminal 205c if the phase departs from the phase of the burst in one direction and develops a signal of the opposite polarity when the phase of the signal applied at terminal 205b departs in phase in the other direction from the phase of the burst. Accordingly, the phase of the oscillator 206 is changed to conform with the phase of the burst signal of reference phase thereby providing at output terminal 202e a 3.58 MHz signal that is in phase with the burst signal of alternate lines of the detected video signal.

The video signal reconstitution subsystem 155 includes the color signal and color burst encoding circuit 251, a combining amplifier 252, a modulator or converter 253, and a carrier generator 254. The color signal and color burst encoding circuit 251 includes a combining amplifier 260, a first modulator 261, a second modulator 262, a phase shifter 263, a combining amplifier 264, and a band pass filter 265. The color signal and color burst encoding circuit 251 also includes input terminals 251a, 251b, 251c, 251d, and output terminal 251e. The first color signal obtained at terminal 162 is applied to input terminal 251a. The second color signal obtained at terminal 163 is applied to terminal 251b. A burst gate signal obtained from terminal 202f of sync signal generator 202 of FIG. 2A is applied to terminal 251c and a 3.58 MHz signal obtained from terminal 202e of sync signal generator 202 of FIG. 2A is applied to input terminal 251d. The first color signal and the burst gate signal are combined in the combining amplifier 260 and applied to one terminal of the modulator 261. The second color signal is applied to one terminal of the second modulator 262. The color subcarrier signal applied to terminal 251d is applied to phase shifter 263 which provides an output of zero reference phase and an output shifted 90 degrees phase with respect to reference phase. The output of zero reference phase is applied to the other terminal of the first modulator 261 and the output shifted 90 degrees with respect to reference phase is applied to the other terminal of the second modulator 262. Outputs from the first modulator 261 and the second modulator 262 are combined in the combining amplifier 264 and then band passed filtered by filter 265 to provide at output terminal 251e a color subcarrier signal one phase of which is modulated by the first color signal and the quadrature phase of which is modulated by the second color signal and also a color burst of reference phase. The combining amplifier 252 has input terminals 252a, 252b and 252c and output terminal 252d. The composite sync obtained from terminal 202g of sync signal generator of FIG. 2A is applied to terminal 252a. The output at terminal 251e of the color signal and color burst encoding circuit 251 is applied to terminal 252b. The luminance signal from terminal 161 is applied to terminal 252c. At the output terminal 252d of the combining amplifier 252 a complete television signal is obtained including luminance and chrominance components, horizontal and vertical synchronization signals and color burst signals. The converter 253 encodes the complete color television signal onto a carrier of the desired frequency supplied to the converter by the carrier generator 254. The output of the converter 253 is connected to a conventional television receiver which converts the television signal into a color picture display.

Reference is now made to FIG. 8 which shows a block diagram of line decoder and waveform generator 53. The response to frame synchronization pulses obtained from frame detector 54 of FIG. 1A applied at terminal 53a, and horizontal drive pulses obtained from master synchronization generator 51 applied at terminal 53b, a voltage waveform is developed at terminal 53c which has a high level during the even lines of a frame and a low level during the odd lines of a frame and provides at output terminal 53d a voltage waveform which has a high level during the occurrence of line 265 of a frame and a low level at all other times. The generator 53 includes a ten stage counter 271, a read-only memory 272, a first delay type flip-flop 273 and a second delay type flip-flop 274. The ten stage counter 271 includes a terminal 271a for resetting the counter, a clock terminal 271b and an output terminal 271c. The output terminal 271c includes 10 lines on which binary coded words representing lines 1–525 occur in sequence in response to the horizontal drive pulses applied to the clock terminal 271b. The ROM or read-only memory 272 includes an input terminal 272a consisting of 10 lines representing the address lines of the ROM and output terminal 272b on which an output occurs at the beginning of each of the even lines of the frame and an output terminal 272c at which an output occurs at the beginning of line 265 of a frame. Input terminal 53a is connected to reset terminal 271a. Input terminal 53b is connected to clocking terminal 271b. Output terminal 271c of counter 271 is connected to input terminal 272a of ROM 272. The output terminal 272b of ROM 272 is connected to the input of type D flip-flop 273, the output of which is connected to output terminal 53c. The output terminal 272c of ROM 272 is connected to the input of type D flip-flop 274, the output of which is connected to output terminal 53d. The type D flip-flop 273 provides at its output a positive pulses of a duration of one line in response to a pulse applied at its input terminal. Type-D flip-flop 274 develops a pulse or high level signal at its output terminal during the occurrence of line 265 of a frame in response to a pulse occurring at the beginning of line 265. The counter 271 is reset during the occurrence of a pulse at the output of frame detector 54 occurring at the beginning of a frame applied to reset terminal 271a. In response to horizontal drive pulses applied to the clock terminal 271b of the counter, counts of 1–525 occur at the output lines 271c. Each of the counts on output lines 271c addresses a particular location in the ROM 272. At the even line locations in ROM 272, a pulse is developed at output terminal 272b. At the address location of line 265 a pulse is developed at output terminal 272c in response to the pulses occurring at output terminal 272b. The type D flip-flop 273 develops a high level during the occurrence of each of the even lines. The type D flip-flop 274 develops a high level output during the occurrence of line 265.

Reference is now made to FIG. 9 which shows a block diagram of the frame synchronization generator 130 of FIG. 1C. The frame synchronization generator 130 includes input terminals 130a, 130b, 130c and output terminal 130d. A 14.32 MHz signal obtained on bus 67 is applied to terminal 130a. Line 265 signal on bus 66 is applied to terminal 130c. Horizontal drive signal obtained on bus 68 is applied to terminal 130b. Frame synchronization signal shown in FIG. 11D is obtained at terminal 130d. The frame synchronization generator includes a trailing edge trigger flip-flop 281, an AND gate 282, a ten stage binary counter 283, a read only memory or ROM 284 and a digital-to-analog converter 285. The trailing edge trigger flip-flop 281 provides at its output the waveform shown in FIG. 11C in response to the horizontal drive pulse of FIG. 11C applied to its input. On the occurrence of the trailing edge of the horizontal drive signal of the FIG. 11A the output of the trailing edge flip-flop rises to a high level and remains there until the leading edge of the next horizontal drive pulse occurs at which time the output drops to a low level. The AND gate 282, in response to pulses of 14.32 MHz rate (not shown) appearing at terminal 130a, to the line 265 signal of FIG. 11B appearing a terminal 130a and to the input of the trailing-edge-trigger flip-flop 281 of FIG. 11C, provides at its output, pulses of of 14.32 MHz frequency occurring during the occurrence of line 265 between the trailing edge of the horizontal drive pulse of that line and the leading edge of the horizontal drive pulse of line 266. The ten stage counter 283 after being reset by the horizontal drive pulse counts each of the pulses applied to the input terminal thereof by the AND gate 282. At its output the counter 283 develops over a period of time of 50.5 microseconds from the trailing edge of the horizontal drive pulse a total of 760 counts. Each of these counts addresses a location in ROM 284 at which is stored a respective 8 bit word representing a respective point on the waveform shown in FIG. 11D. Each point is spaced from an adjacent point by a time period of 70 nanoseconds. Each of the words in sequence are converted by the digital-to-analog converter 285 into samples of an analog signal as indicated in FIG. 11D. The count of the ten stage binary counter starts at the trailing edge of the horizontal drive pulses of line 265 which is the zero point 311 of the wave. Prior to this point in time, the signal is at blanking level. The waveform of FIG. 11D includes a portion containing 128 cycles of a 2.864 MHz sine wave included in an interval of 44 microseconds and a second portion of constant amplitude one-half the peak-to-peak amplitude of the sine wave for a period of 6.5 microseconds. During count 760 the level of the waveform drops to zero level and remains there until the occurrence of line 265 of the next frame of the video or television signal.

Reference is now made to FIG. 10 which shows the synchronizing line detector 201 of FIG. 2A. The synchronizing line detector 201 includes an input terminal 201a and an output terminal 201b. Input terminal 201a is connected to the output terminal 157b of IF converter and video detector 157. At the output terminal 201b is obtained the frame synchronizing pulses shown in FIG. 11G marking the beginning of line 266 of a frame of a television or video signal. The synchronizing line detector 201 includes a circuit 291 for detecting the 2.864 MHz portion of the signal of the frame synchronizing signal of FIG. 11D, a circuit 292 for the detection of the trailing edge of the frame synchronizing signal of FIG. 11D and a circuit 293 for inhibiting the operation of circuit 292 during the occurrence of the 2.864 MHz signal of the frame synchronizing signal of FIG. 11D. The circuit 291 includes a parallel resonant circuit 295 tuned to the 2.864 MHz signal having a relatively high Q of about 100, an emitter follower stage 296, a detector 297, a comparator 298, and an AND gate 299. In response to the 2.864 MHz signal appearing at the terminal 201a, a voltage is developed across the capacitor of detector 297 which increases in amplitude from zero amplitude at time zero of the synchronizing signal waveform to maximum amplitude occurring at point 312 (FIG. 11D) of the 2.86 MHz waveform and thereafter decays at a rate determined by the time constant of the detector circuit 297. One of the input terminals of the comparator 298 is set at a particular reference level for clipping the output of the detector. Accordingly, at the output of the comparator 298, a waveform, such as shown in FIG. 11E, is obtained. During the occurrence of the 2.864 MHz signal the output increases from zero level to a high level, is maintained at that high level until the voltage at the output of the detector 297 decays to a value below the reference level. This latter level is set so that the high level at the output of the comparator is maintained beyond the horizontal drive pulses of line 266. The output of the comparator is supplied to one terminal of the AND gate 299.

The circuit 292 includes a gating circuit 301 including a diode 302 and a load resistor 303 connected in series. The diode 302 is poled to pass negative going edges of the signal coupled from terminal 201a through coupling capacitor 304 thereto. The edge detector circuit 292 also includes a differentiator 305 consisting of a capacitor 305a and a resistor 305b connected in series which differentiates the negative going edges of voltages appearing across resistor 303. The inverter 306 inverts the voltage developed across resistor 305b and produces a pulse such as shown in FIG. 11F occurring at time of occurrence of the trailing edge 313 of the waveform of FIG. 11D. The output of the inverter 306 is applied to the other input of the AND gate 299 thereby producing at its output a pulse coincident with the trailing edge 313 of the waveform of FIG. 11D at output terminal 201b.

A biasing or inhibiting circuit 293 provides a voltage to bias or inhibit the gate circuit 301 during the occurrence of the 2.864 MHz waveform of FIG. 11D. The circuit 293 includes a voltage doubler or detector 307 having an output load resistor 307a in parallel with a capacitor 307b. The input of the inhibiting circuit 307 is coupled to input terminal 201a through the coupling capacitor 308. The output across capacitor 301b is connected to the cathode of diode 302 through resistor 309. The time constant of the circuit consisting of resistor 307a and capacitor 307b is set to be longer than one half the reciprocal of 2.864 MHz or longer than about 0.4 of a microsecond and shorter than about 6 microseconds. Thus, during the occurrence of the 2.864 MHz signal, a bias is developed across the capacitor 307b which maintains the cathode of diode 302 at a high level and accordingly nonconductive thereby inhibiting the action of the edge detection circuit 292 during the occurrence of these waves. After termination of the 2.864 MHz signal, the bias across the capacitor 307b decays rapidly and after a time period of about 6.5 microseconds representing the duration of the constant voltage portion of the waveform of FIG. 11D, it has decayed to a sufficiently low value to permit the trailing edge 313 of the waveform of FIG. 10D to be conducted through the gate circuit 301 thus enabling operation of the edge detection circuit 292. The function of the inhibiting or biasing circuit 293 is to insure detection of a falling edge only after the occurrence of the 2.864 MHz portion of the synchronizing signal of FIG. 11D.

While in the transmission station of FIGS. 1A–1C and the receiving station of FIGS. 2A–2C, the switching or multiplexing functions required have been implemented for reasons of simplicity of description by assemblages of switches, for example switch 58 operated by controller 58 in response to an even line signal for the timing of the actuation of the switch, such assemblages can be completely implemented by use of various logic circuits, as is well known to those skilled in the art.

While time compression and time multiplexing of each of the components of the first and second video signals at the transmission station and de-multiplexing and time expansion of the signals at the receiving station were performed by digital means, these operations could have been performed by analog means utilizing charge coupled shift registers, thus avoiding the need to convert analog samples into digital samples and vice versa. With charge coupled shift registers time compression and expansion as well as multiplexing and de-multiplexing of the signals would be performed as in the digital shift registers by clocking lines of samples into and out of the shift registers at different rates and at controlled times.

In the system of the present invention, at the transmitting station the sequence of lines $l_1+l_2$, $l_3+l_4$, $l_5+l_6$, etc., and the sequence of lines $l_1-l_2$, $l_3-l_4$, $l_5-l_6$, etc., formed for a first video signal. The sequence of lines $l'_1+l'_2$, $l'_3+l'_4$, $l'_5+l'_6$, etc., and the sequence of lines $l'_1-l'_2$, $l'_3-l'_4$ are also formed for a second video signal. Corresponding lines of a luminance line pair sum signal and a luminance line pair difference signal of the first video signal are time compressed to the same bandwidth and then multiplexed to form a corresponding line of a first compound signal. A second compound signal is similarly formed for the second video signal. The first and second compound signals are interleaved to form a third compound signal which is transmitted as amplitude modulation of a carrier. At the receiving station inverse operations are utilized to recover the first and second video signals. The sum sequence $l_1+l_2$, $l_3+l_4$, $l_5+l_6$, etc., and the difference sequence $l_1-l_2$, $l_3-l_4$, $l_5-l_6$, etc., of the first video signal are added to obtain the sequence $l_1$, $l_3$, $l_5$, etc. and are subtracted to obtain the sequence $l_2$, $l_4$, $l_6$, etc. The latter two sequences are combined to reconstitute the first video signal. Alternatively, the sum and difference sequences corresponding to the second video signal could have been processed to reconstitute the second video signal. This implementation of the invention is preferred for highest accuracy. The sequence $l_1$, $l_3$, $l_5$, etc. and the difference sequence $l_1-l_2$, $l_3-l_4$, $l_5-l_6$, etc., could as well have been formed at the transmitting stations for the first video signal and similar sequences formed for the second video signal. At the receiving station the two sequences of the first video signal could have been recovered in the same way. The sequence $l_1$, $l_3$, $l_5$, etc. would be obtained directly and the subtraction of the two sequences would provide $l_2$, $l_4$, $l_6$, etc. Combining the latter two sequences would provide the reconstituted sequence $l_1$, $l_2$, $l_3$, $l_4$, $l_5$, $l_6$, etc. of the first video signal. This implementation of the invention is preferred for lowest cost.

While the two cases discussed above are preferred for reasons of accuracy and simplicity, respectively, any pair of linear combinations of the two image lines which are linearly independent could be chosen for transmission, with the appropriate inverse linear combination being employed in the reconstruction thereof.

Since the eye has relatively poor resolution for color information, it is not actually necessary to use the average chrominance signals as indicated in connection with FIG. 1A. Instead, it is possible to use the color signal from either one of the two lines, or it can be derived from the two color signals in any other convenient way.

Bandwidth limitation of the average luminance component causes vertical edges in the reconstructed image to appear blurred, and limitation of the bandwidth of the vertical detail component results in a blocky appearance of diagonal edges. Limitations on the bandwidth of the color signal components results in a region of inaccurate color near the borders of colored objects in the scene. Since bandwidth restrictions on any of the signal components causes some degree of picture degradation, it is appropriate to limit the bandwidths of each signal component so as to produce a minimum perceived degradation for a given total bandwidth. It has been experimentally determined that the overall perceived degradation is minimized for a given total bandwidth when the degradation from each cause are of approximately equal importance. It has also been determined that these degradations are of approximately equal importance to perceived image quality when the bandwidths of the signal components are in the ratio of 3 to 1.35 to 0.45 to 0.45, for the average luminance, vertical detail, and the two color signals respectively.

In the system of FIGS. 1A, 1B and 1C, the output of the carrier subsystem 16 is applied to a transmission channel. The transmission channel can be a recording media such as magnetic tape, in which case the signals can be recovered later and applied to the r-f tuner 156 of the receiving station 150 of FIGS. 2A, 2B and 2C. In this case the carrier generator 135 (FIG. 1C) may operate at a lower frequency. The transmission channel can also be a cable television or a television broadcast channel.

The two audio signals at the transmitting station corresponding to the two television signals can be encoded as frequency modulation of two subcarriers displaced in frequency and can be selectively detected at the receiving station.

While the invention has been described in a specific embodiment, it will be understood that modifications, such as those described above, may be made by those skilled in the art and it is intended by the appended claims to cover all such modifications and changes as fall within the true spirit and scope of the invention.

What is claimed is:

1. A system for multiplexing a first video signal and a second video signal into a compound video signal having a bandwidth substantially less than the sum of the bandwidths of the first and second video signals comprising, means for providing said first video signal, said first video signal including a plurality of successive lines of signal, each line having a duration of a first predetermined time, said plurality of lines consisting of a first set of alternate lines and a second set of alternate lines, each line of said first video signal including a first luminance component having frequencies extending over a band of frequencies from zero frequency to a first predetermined frequency, a first color component consisting of sidebands of a subcarrier of one phase modulated in amplitude by a first color signal, and a second color component consisting of side bands of said subcarrier of another phase modulated in amplitude by a second color signal, said other phase being in quadrature to said one phase, said subcarrier having a frequency which is situated near the upper end of said band of frequencies of said first luminance component and which is an odd multiple of one-half of the reciprocal of said first predetermined time, means for forming a plurality of lines of a first combined luminance signal, said plurality of lines of said first combined luminance signal consisting of a first set of alternate lines and a second set of alternate lines, each line having a duration of said first predetermined time, the amplitude of each line of said first set of alternate lines of said first combined luminance signal being a first linear combination of the amplitudes of lines of said first set of alternate lines of said first luminance signal and the amplitudes of lines of said second set of alternate lines of said first luminance signal, the amplitude of each line of said second set of alternate lines of said first combined luminance signal being zero, means for forming a plurality of lines of a second combined luminance signal, said plurality of lines of said second combined luminance signal consisting of lines of a first set of alternate lines and a second set of alternate lines, each line having a duration of said first predetermined time, the amplitude of each line of said first set of alternate lines of said second combined luminance signal being a second linear combination of the amplitudes of lines of said first set of alternate lines of said first luminance signal and the amplitudes of lines of said second set of alternate lines of said first luminance signal, said second linear combination of said first luminance signal being independent of said first linear combination of said first luminance signal, the amplitude of each line of said second set of alternate lines of said second combined luminance signal being zero, means for limiting the bandwidth of said first combined luminance signal to a first predetermined bandwidth, means for limiting the bandwidth of said second combined luminance signal to a second predetermined bandwidth, said second predetermined bandwidth being substantially less than said first predetermined bandwidth, means for compressing the duration of each of the lines of said first combined luminance signal to a duration of a second predetermined time less than said first predetermined time to increase the bandwidth thereof to a third predetermined bandwidth, said third predetermined bandwidth being greater than said first predetermined bandwidth, means for compressing the duration of each of the lines of said second combined luminance signal to a duration of a third predetermined time to increase the bandwidth thereof to said third predetermined bandwidth, means for providing a second video signal, said second video signal including a plurality of successive lines of signal each line having a duration of said first predetermined time, said plurality of lines consisting of a first set of alternate lines and a second set of alternate lines, each line of said second video signal including a second luminance component having frequencies extending over a band of frequencies from zero frequency to said first predetermined frequency, a third color component consisting of sidebands of a subcarrier of one phase modulated in amplitude by a third color signal, and a fourth color component consisting of sidebands of said subcarrier of another phase modulated in amplitude by a fourth color signal, said other phase being in quadrature to said one phase, said subcarrier having a frequency which is situated near the upper end of said band of frequencies of said second luminance component and which is an odd multiple of one-half of the reciprocal of said first predetermined time, means for forming a plurality of lines of a third combined luminance signal, said plurality of lines of said third combined luminance signal consisting of a first set of alternate lines and a second set of alternate lines, each line having a duration of said first predetermined time, the amplitude of each line of said first set of alternate lines of said third combined luminance signal being a third linear combination of the amplitudes of lines of said first set of alternate lines of said second luminance signal and the amplitudes of lines of said second set of alternate lines of said second luminance signal, the amplitude of each line of said second set of alternate lines of said third combined luminance signal being zero, means for forming a plurality of lines of a fourth combined luminance signal, said plurality of lines of said fourth combined luminance signal consisting of a first set of alternate lines and a second set of alternate lines, each line having a duration of said first predetermined time, the amplitude of each line of said first set of alternate lines of said fourth combined luminance signal being a fourth linear combination of the amplitudes of lines of said first set of alternate lines of said second luminance signal and the ampliutdes of lines of said second set of alternate lines of said second luminance signal, said fourth linear combination of said second luminance signal being independent of said third linear combination of said second luminance signal, the amplitude of each line of said second set of alternate lines of said fourth combined luminance signal being zero, means for limiting the bandwidth of said third combined luminance signal to said first predetermined bandwidth, means for limiting the bandwidth of said fourth combined luminance signal to said second predetermined bandwidth, means for compressing the duration of each of the lines of said third combined luminance signal to a duration of said second predetermined time to increase the bandwidth thereof to said third predetermined bandwidth, means for compressing the duration of each of the lines of said fourth combined luminance signal to a duration of said third predetermined time to increase the bandwidth thereof to said third predetermined bandwidth, means for forming a plurality of lines of a first compound video signal, said plurality of lines of said first compound video signal consisting of a first set of alternate lines and a second set of alternate lines, each line of said first set of alternate lines of said first compound video signal being formed by time multiplexing a respective compressed line of said first combined luminance signal and a respective compressed line of said second combined luminance signal, the amplitude of each line of said second set of alternate lines of said first compound video signal being zero, means for forming a plurality of lines of a seocnd compound video signal, said plurality of lines of said second compound video signal consisting of lines of a first set of alternate lines and a second set of alternate lines, each line of said first set of alternate lines of said second compound video signal being formed by time multiplexing a respective compressed line of said third combined luminance signal and a respective compressed line of said fourth combined luminance signal, the amplitude of each line of said second set of alternate lines of said second compound video signal being zero, means for interleaving the lines of said first set of alternate lines of said first compound video signal and said first set of lines of said second compound video signal to provide a third compound video signal.

2. The combination of claim 1 including means for transmitting each of the lines of said third compound video signal to a transmission channel.

3. The combination of claim 2 in which said first linear combination is an algebraic sum and in which said second linear combination is an algebraic difference of a line of said first set of alternate lines of said first luminance signal delayed by said first predetermined time and a successive line of said second set of alternate lines of said first luminance signal, and in which said third linear combination is an algebraic sum and in which said fourth linear combination is an algebraic difference of a line of said first set of alternate lines of said second luminance signal delayed by said first predetermined time and a successive line of said second set of alternate lines of said second luminance signal.

4. The combination of claim 3 in which the coefficient of one of the terms of said first linear combination is zero and in which the coefficient of one of the terms of said third linear combination is zero.

5. The combination of claim 3 in which is provided
means for recovering said third compound video signal from said transmission channel,
means for recovering said first compound video signal from said third compound video signal,
means for recovering said compressed first combined luminance signal from said first compound video signal and expanding the duration thereof to the duration of said first predetermined time,
means for recovering said compressed second combined luminance signal from said first compound video signal and expanding the duration thereof to the duration of said first predetermined time,
means for forming the sum of each of said first set of alternate lines of said first combined luminance signal and a respective line of said first set of alternate lines of said second combined luminance signal to reconstitute a respective line of said first set of alternate lines of said first luminance signal,
means for forming the difference of each line of said first set of alternate lines of said first combined luminance signal and a respective line of said first set of alternate lines of said second combined luminance signal to reconstitute a respective line of said second set of alternate lines of said first luminance signal,
means for interleaving said first and second sets of alternate lines of said first luminance signal to reconstitute said first luminance signal.

6. The combination of claim 5 in which said transmission channel is a storage medium and in which is provided means for storing said third compound video signal in said storage medium.

7. The combination of claim 6 in which said storage medium is magnetic tape.

8. The combination of claim 5 in which said means for transmitting each of the lines of said third compound video signal to said transmission channel includes modulating in amplitude a carrier wave with said third compound video signal.

9. The combination of claim 1 in which the bandwidth of said first combined signal is about 3 MHz and the bandwidth of said second combined signal is about 1.35 MHz, and in which the bandwidth of said third combined signal is about 3 MHz and the bandwidth of said fourth combined signal is about 1.35 MHz.

10. In combination:
means for providing a first video signal including a first luminance signal, a first color signal and a second color signal, said first luminance signal, said first color signal and said second color signal each consisting of a plurality of successive lines, each line having a duration of a first predetermined time,
means for linearly combining in accordance with a first linear relationship the amplitudes of lines of said first luminance signal to obtain a first combined luminance signal,
means for linearly combining in accordance with a second linear relationship the amplitudes of lines of said first luminance signal to obtain a second combined luminance signal, said second linear relationship being independent of said first linear relationship,
means for combining in accordance with a third linear relationship the amplitudes of lines of said first color signal to obtain a first combined color signal,
means for combining in accordance with a fourth linear relationship the amplitudes of lines of said second color signal to obtain a second combined color signal,
means for limiting the bandwidth of said second combined luminance signal, said first combined color signal and said second combined color signal in relation to the bandwidth of said first combined luminance signal,
means for compressing the duration of the lines of said first combined luminance signal, said second combined luminance signal, said first combined color signal and said second combined color signal to increase the bandwidth of each of said signals to a first value of bandwidth,
means for forming a plurality of lines of a first compound video signal, said plurality of lines of said first compound video signal consisting of a first set of alternate lines and a second set of alternate lines, each line of said first set of alternate lines of said first compound video signal being formed by time multiplexing respective compressed lines of said first combined luminance signal, said second combined luminance signal, said first combined color signal and said second combined color signal, the amplitude of each line of said second set of alternate lines of said first compound signal being zero,
means for providing a second video signal including a second luminance signal, a third color signal and a fourth color signal, said second luminance signal, said third color signal and said fourth color signal each consisting of a plurality of successive lines, each line having a duration of said first predetermined time,
means for linearly combining in accordance with a fifth linear relationships the amplitudes of lines of said second luminance signal to obtain a third combined luminance signal,
means for linearly combining in accordance with a sixth linear relationship the amplitudes of lines of said second luminance to obtain a fourth combined luminance signal,
means for combining in accordance with a seventh linear relationship the amplitudes of lines of said third color signal to obtain a third combined color signal,
means for combining in accordance with an eighth linear relationship the amplitudes of lines of said fourth color signal to obtain a fourth combined color signal, means for limiting the bandwidth of said fourth combined luminance signal, said third combined color signal and said fourth combined color signal in relation to the bandwidth of said third combined luminance signal, means for compressing the duration of the lines of said third combined luminance signal, said fourth combined luminance signal, said third combined color signal and said fourth combined color signal to increase the bandwidth of each of said signals to said first value of bandwidth, means for forming a plurality of lines of a second compound video signal, said plurality of lines of said second compound video signal consisting of lines of a first set of alternate lines and a second set of alternate lines, each line of said first set of alternate lines of said second compound video signal being formed by time multiplexing respective compressed lines of said third combined luminance signal, said fourth combined luminance signal, said third combined color signal and said fourth combined color signal, the amplitude of each line of said second set of alternate lines of said second compound video signal being zero, means for interleaving the lines of said first set of alternate lines of said first compound video signal and said first set of lines of said second compound video signal to provide a third compound video signal.

11. The combination of claim 10 including means for transmitting each of the lines of said third compound video signal to a transmission channel.

12. The combination of claim 11 in which said first linear relationship is an algebraic sum and in which said second linear relationship is an algebraic difference of a line of a first set of alternate lines of said first luminance signal delayed by said first predetermined time and a successive line of a second set of alternate lines of said first luminance signal, and in which said fifth linear relationship is an algebraic sum and in which said sixth linear relationship is an algebraic difference of a line of a first set of alternate lines of said second luminance signal delayed by said first predetermined time and a successive line of a second set of alternate lines of said second luminance signal.

13. The combination of claim 12 in which the coefficient of one of the terms of said first linear combination is zero and in which the coefficient of one of the terms of said fifth linear combination is zero.

14. The combination of claim 12 in which is provided means for recovering said third compound video signal from said transmission channel, means for recovering said first compound video signal from said third compound video signal, means for recovering said compressed first combined luminance signal from said first compound video signal and expanding the duration thereof to the duration of said first predetermined time, means for recovering said compressed second combined luminance signal from said first compound video signal and expanding the duration thereof to the duration of said first predetermined time,, means for forming the sum of each of a first set of alternate lines of said first combined signal and a respective line of a first set of alternate lines of said second combined signal to reconstitute a respective line of a first set of alternate lines of said first luminance signal, means for forming the difference of each line of said first set of alternate lines of said first combined signal and a respective line of said first set of alternate lines of said second combined signal to reconstitute a respective line of a second set of alternate lines of said first luminance signal, means for interleaving said first and second sets of alternate lines of said first luminance signal, means for recovering said compressed first combined color signal from said first compound video signal and expanding the duration thereof to the duration of said first predetermined time and repeating each successive line of said expanded first combined color signal to reconstitute said first color signal, means for recovering said compressed second combined color signal from said first compound video signal and expanding the duration thereof to the duration of said first predetermined time and repeating each successive line of said expanded second combined color signal to reconstitute said second color signal.

15. The combination of claim 14 in which said transmission channel is a storage medium and in which is provided means for storing said third compound video signal in said storage medium.

16. The combination of claim 15 in which said storage medium is magnetic tape.

17. The combination of claim 14 in which said means for transmitting each of the lines of said third compound video signal to said transmission channel includes modulating in amplitude a carrier wave with said third compound video signal.

18. The combination of claim 10 in which the bandwidth of said first combined luminance signal is about 3 MHz, the bandwidth of said second combined luminance signal is about 1.35 MHz, in which the bandwidth of said first combined color signal is about 0.45 MHz, in which the bandwidth of said second combined color signal is about 0.45 MHz, in which the bandwidth of said third combined luminance signal is about 3 MHz, in which the bandwidth of said second combined signal is about 1.35 MHz, in which the bandwidth of said third combined color signal is about 0.45 MHz, and in which the bandwidth of said fourth combined color signal is about 0.45 MHz.

* * * * *